(12) United States Patent
Davar et al.

(10) Patent No.: US 10,826,953 B2
(45) Date of Patent: *Nov. 3, 2020

(54) SUPPLEMENTING USER WEB-BROWSING

(71) Applicants: Jonathan Davar, Saratoga, CA (US); Serge M Krasnyansky, Stamford, CT (US)

(72) Inventors: Jonathan Davar, Saratoga, CA (US); Serge M Krasnyansky, Stamford, CT (US)

(73) Assignees: Jonathan Davar, Saratoga, CA (US); Serge M Krasnyansky, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,391

(22) Filed: Nov. 1, 2018

(65) Prior Publication Data

US 2019/0068659 A1 Feb. 28, 2019

Related U.S. Application Data

(63) Continuation-in-part of application No. 15/258,053, filed on Sep. 7, 2016, now Pat. No. 10,165,023, which is a continuation of application No. 14/685,959, filed on Apr. 14, 2015, now Pat. No. 9,467,487, which is a continuation of application No. 13/899,890, filed on
(Continued)

(51) Int. Cl.
| | |
|---|---|
| *H04L 29/06* | (2006.01) |
| *H04L 29/08* | (2006.01) |
| *G06F 16/95* | (2019.01) |
| *G06F 16/9535* | (2019.01) |
| *G06F 16/2457* | (2019.01) |
| *G06Q 50/00* | (2012.01) |
| *G06Q 30/06* | (2012.01) |

(Continued)

(52) U.S. Cl.
CPC ...... *H04L 65/403* (2013.01); *G06F 16/24578* (2019.01); *G06F 16/95* (2019.01); *G06F 16/957* (2019.01); *G06F 16/9535* (2019.01); *G06Q 30/02* (2013.01); *G06Q 30/06* (2013.01); *G06Q 50/01* (2013.01); *H04L 67/18* (2013.01); *H04L 67/327* (2013.01); *H04L 67/02* (2013.01)

(58) Field of Classification Search
CPC ...................................................... G06Q 30/02
USPC ................................................. 715/763–765
See application file for complete search history.

(56) References Cited

U.S. PATENT DOCUMENTS

| | | | |
|---|---|---|---|
| 2007/0121843 A1 | 5/2007 | Atazky et al. | |
| 2008/0022220 A1* | 1/2008 | Cheah | G06Q 30/02 715/769 |

(Continued)

OTHER PUBLICATIONS

Notice of Allowance for U.S. Appl. No. 16/189,002 by USPTO dated May 11, 2020.

*Primary Examiner* — Cao H Nguyen
(74) *Attorney, Agent, or Firm* — Platinum Intellectual Property LLP

(57) ABSTRACT

An apparatus and method of providing a user with a web-browser supplement is disclosed. One method includes providing access to a focal group, wherein the focal group includes at least one member having at least one association with the user. Access is provided to information associated with the at least one member having relevance to the focal group. Web browsing by the user is supplemented by the information of the members of the focal group.

20 Claims, 15 Drawing Sheets

Related U.S. Application Data

May 22, 2013, now Pat. No. 9,032,302, which is a continuation of application No. 13/588,169, filed on Aug. 17, 2012, now Pat. No. 8,479,100, which is a continuation of application No. 12/316,992, filed on Dec. 18, 2008, now Pat. No. 8,276,079.

(60) Provisional application No. 61/008,957, filed on Dec. 21, 2007.

(51) Int. Cl.
*G06Q 30/02* (2012.01)
*G06F 16/957* (2019.01)

(56) References Cited

U.S. PATENT DOCUMENTS

| | | | |
|---|---|---|---|
| 2008/0077574 A1* | 3/2008 | Gross | G06Q 30/02 |
| 2009/0164641 A1* | 6/2009 | Rogers | G06Q 30/02 |
| | | | 709/227 |

* cited by examiner

SUPPLEMENTING USER WEB-BROWSING

RELATED APPLICATIONS

This patent application is a continuation-in-part of U.S. patent application Ser. No. 15/258,053 filed on Sep. 7, 2016, which is a continuation of U.S. patent application Ser. No. 14/685,959 filed on Apr. 14, 1959, which is a continuation of U.S. patent application Ser. No. 13/899,890, filed May 22, 2013 and Granted as U.S. Pat. No. 9,032,302, which is a continuation of U.S. patent application Ser. No. 13/588,169, filed Aug. 17, 2012 and Granted as U.S. Pat. No. 8,479,100, which is a continuation of U.S. patent application Ser. No. 12/316,992, filed Dec. 18, 2008 and Granted as U.S. Pat. No. 8,276,079, which claims priority to provisional patent application No. 61/008,957, filed Dec. 21, 2007, which are all herein incorporated by reference.

FIELD OF THE DESCRIBED EMBODIMENTS

The described embodiments relate generally to web browsing. More particularly, the described embodiments relate to a method and apparatus for supplementing a user's web browsing.

BACKGROUND

The internet can connect individuals through, for example, a mesh of social networks, portals, commerce sites and forums. Many of these sites attempt to model relationships to facilitate commerce and build systems for providing recommendations. These social networks include many individuals that can interact with each other.

There is a lack, however, of a useful mechanism within social networks for mimicking interpersonal trust and reference networks. For example, if one needs to find a babysitter, a heart surgeon or a plumber, one generally turns to trusted friends to obtain references. That is, these referred service providers involve the well-being of family, and/or impact one's finances, and therefore, are typically naturally screened by the person looking for a reference. However, the recommendations provided by social networks do not include a personal connection between the recommender and the receiver of the recommendation. Additionally, the strength of the recommendations can be difficult to determine.

It is desirable to have a method, system and apparatus in which groups of commonly associated individuals can provide an internet user that is web browsing with additional intelligence. It is additionally desirable that the method, system and apparatus be adaptively updated as information associated with the groups change over time.

SUMMARY

One embodiment includes a method of providing a user with a web-browser supplement. The method includes providing access to a focal group, wherein the focal group includes at least one member having at least one association with the user. Access is provided to information associated with the at least one member having relevance to the focal group. Web browsing by the user is supplemented by information of the members of the focal group.

Another embodiment includes a method of overlaying web browsing with focal group intelligence. The method includes creating a focal group, wherein the focal group includes at least one other user having at least one association with the user. Information about the at least one other user having relevance to the focal group is obtained. Web browsing by the user is over-layed, thereby supplementing the web browsing by the user by providing information of the other users of the focal group.

In certain embodiments, systems and methods in accordance with various embodiments of the present disclosure may overcome one or more of the aforementioned and other deficiencies experienced in conventional approaches to providing relevant content. In particular, various embodiments describe systems and methods for supplementing a user's web browsing based on grouping criteria. For example, a request is received for content to be displayed on (or otherwise presented via) a computing device, in this case for a particular user of the computing device. The user can be associated with a user account and the user account can be associated with a portable aggregated social graph, which includes a plurality of user accounts organized into one or more focal groups based at least in part on grouping criteria. The grouping criteria can include at least location information such as a desired geographical location, an actual geographic location, or time information that includes an indication of a time event. A time event can be an event occurring during a particular period of time.

In order to provide relevant information from focal group members associated with a focal group, at least one member for a focal group from the plurality of user accounts is identified based at least in part on the grouping criteria, the at least one member having an association with a user of the user account. The identified user account(s) can be associated with a focal group and the identified user accounts can provide members access to information based at least in part on a relevance score associated with individual members. This can include, for example, providing information from members associated with a highest score although in various other embodiments information can be provided in accordance with other approaches.

From the perspective of a user, a user experience may be defined in terms of the degree to which the focal group members are relevant to the user. In an effort to provide the most relevant content, as well as to facilitate user engagement, systems use various techniques to analyze and select, from a large set of available members, a subset of members that are relevant to a user's interests. For example, in order to keep a user engaged, a ranking algorithm such as a relevance profile used to rank focal group members is optimized based at least in part on a perceived level of importance of members of the focal group. In an embodiment, to determine a level of importance, a level of affinity between the user and the members of the focal group is determined, as well as a level of proficiency or expertise of individual focal group members. As additional data for the user and/or members is gathered, such as through the user or members interacting with content associated with the grouping criteria, the rankings can be updated accordingly. The rankings and selection can be used to determine members to select, and the selected members can be used to determine content to present to a user, which can improve the overall user experience while increasing profit for the provider of that content.

Other aspects and advantages of the described embodiments will become apparent from the following detailed description, taken in conjunction with the accompanying drawings, illustrating by way of example the principles of the described embodiments.

DETAILED DESCRIPTION

Figure 1:
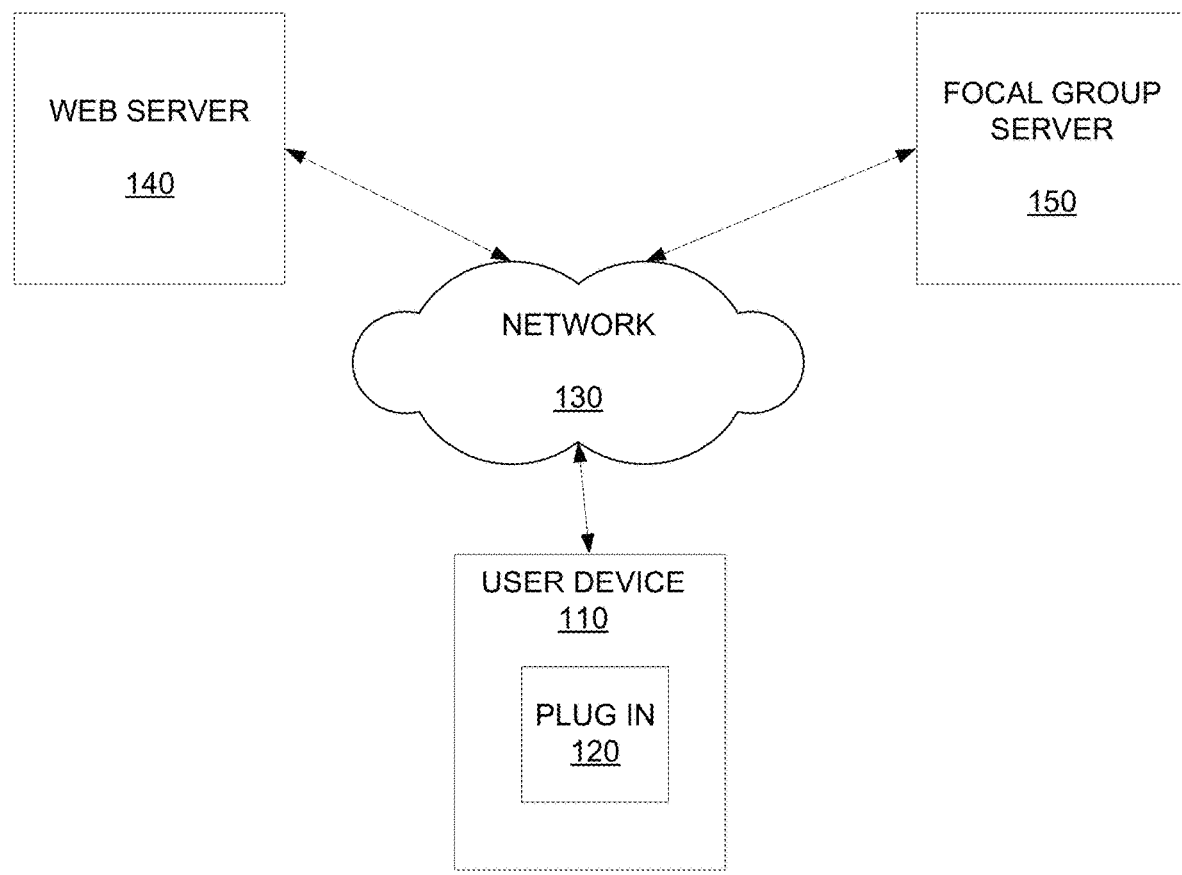
FIG. 1 shows an example of a user computing device that can utilize methods of supplementing web browsing of the user.

As shown in the drawings for purposes of illustration, the described embodiments are embodied in an apparatus and method for supplementing web browsing of a user. The web browsing can be of any form including textual, audio or visual formats, and can be supplemented with any combinations of textual, audio or visual formats, or any other format that can be used for web browsing.

FIG. 1 shows an example of a computing device 110 that can utilize methods of supplementing web browsing of a user of the computing device 110. For this embodiment, the user's computing devices includes a plug-in 120. An embodiment of the plug-in 120 is a software program that when executed supplements the user's web browsing by supplementing information provided by the web browsing with information associated with a focal group. That is, the user's web browsing is improved by manipulating the information provided to the user based on intelligence and information provided by members of the focal group or obtained by members of the focal group.

As shown, the computing device 110 is connected through a network 130 to web server 140 and a focal group server 150. For this example, the web server 140 allows the user to "surf" the internet, and access web pages. The web pages provide the user with information related to a subject as generally (but not exclusively) determined by the user. The web server 140 and the focal group server 150 are shown as separate servers. However, it is to be understood that this is merely one example of how access to web page information and focal group information can be provided.

As shown, the focal group server 150 maintains information of the focal group. Generally, this information includes the members of one or more focal groups that have some relationship with the user. Additionally, the focal group server 150 can maintain information of each user of each focal group. As will be described, the members of the focal group can be one or more individuals and/or corporate entities. The focal group can be created or borrowed from somewhere else. The information associated with each member can include many things, such as, for example, preferences, knowledge, history of interactions with the user, and/or experiences of the member. Additionally, the focal group information can be supplemented with focal group applications.

Supplementing Web Browsing

Supplementing the user's web browsing can be provided in one or more ways. The web browsing can be supplemented by, for example, providing additional information to information provided by a web page, filtering information of the web page, and/or sorting information of the web page. Again, the supplementation is based on the information associated with members of the focal group, and therefore, the intelligence of the focal group members can be used to the advantage of the user when web browsing.

Focal Groups

Generally, a focal group is a small restricted group of people who are associated based on activity or topic. The focal group can include, for example, a group of friends, family members or people with common interests. As will be described, a focal group can include any number of members. The member can be individual people or even corporate entities. The focal group can include, for example, a single person who is considered an expert in a particular subject area, or the focal group can include many individual who are commonly associated by some activity or other criteria. The focal groups can be formed or borrowed from somewhere else.

Focal Group Information

As described, web browsing of the user is supplemented by the focal group information. The focal group information can include, for example, a proficiency of group members, a degree of affinity between group members, a history of proficiency and affinity of group members, a member's rating by group members, reviews and/or opinions of the member, any information contributed by members, events involving a group member, actions taken by a group member, requests for information put in by other group members for a group member, and/or member ownership of a product or usage of a service. It is to be understood that an embodiment includes the focal group information being dynamic. Actions by each of the focal group member can cause the focal group information to change.

The described embodiments can include various types of information associated with the members of the focal group. One type of information is the affinity of each focal group member with the user. The affinity can be adaptive and is generally based on the strength of the relationship and level of interaction between each focal group member and the user. The affinity can be "deduced" and/or "assigned". An assigned affinity is one that is given by one focal group member to another, based on an individual perception or information. A deduced affinity is one that is computed automatically from several assigned affinities, based on one or more affinity formulas.

For other embodiments, another type of information is a proficiency of each focal group member. The proficiency can be adaptive based on the level of competence and/or expertise regarding a subject matter. Proficiency can be "deduced" and/or "assigned". An assigned proficiency is one that is given by one focal group member to another, based on an individual perception or information. A deduced proficiency is one that is adaptively computed automatically from several assigned proficiencies.

For other embodiments, another type of information includes focal group applications that can, for example, extend the overlay and run within the framework of overlay. An example of a focal group application includes, for example, an "add to wish list" application, that includes an icon displayed on a web page, such that when the icon is clicked (selected), it adds a given item (displayed on the original web page) to a focal group member's wish list. (A wish list in this context is a list of items that the user wishes to own—the list is maintained by the focal group user so that other users can access it, and provide, for example, gift ideas).

Overlay

As described, an embodiment of the supplementing the user's web browsing includes providing the user with a web overlay. The overlay provides an intelligent software framework that runs focal group applications, supplements, filters, sorts and displays the browsed information.

Overlay Plug in

An embodiment of the overlay plug in includes a software component installed on a user's computer. For an embodiment, the plug in is installed in a web browser as an extension. In an embodiment, the purpose of the plug in is to provide the user with access to Focal Group servers and communicate with the servers. More specifically, this embodiment includes sending contextual information describing the web location being visited by the user, and/or receiving instructions and information and/or knowledge enabling the plug-in software to supplement the browsed info. In certain embodiments, one of a semantic language technique or an image recognition technique can be used to analyze the content displayed on the interface to recognize content and determine contextual information or other such information operable to be used to describe the content such as what type of content is presented (e.g., image, video, text, sound, etc.), a category the content can be associated with (e.g., entertainment, shopping, shopping categories, event, location, etc.).

Figure 2:
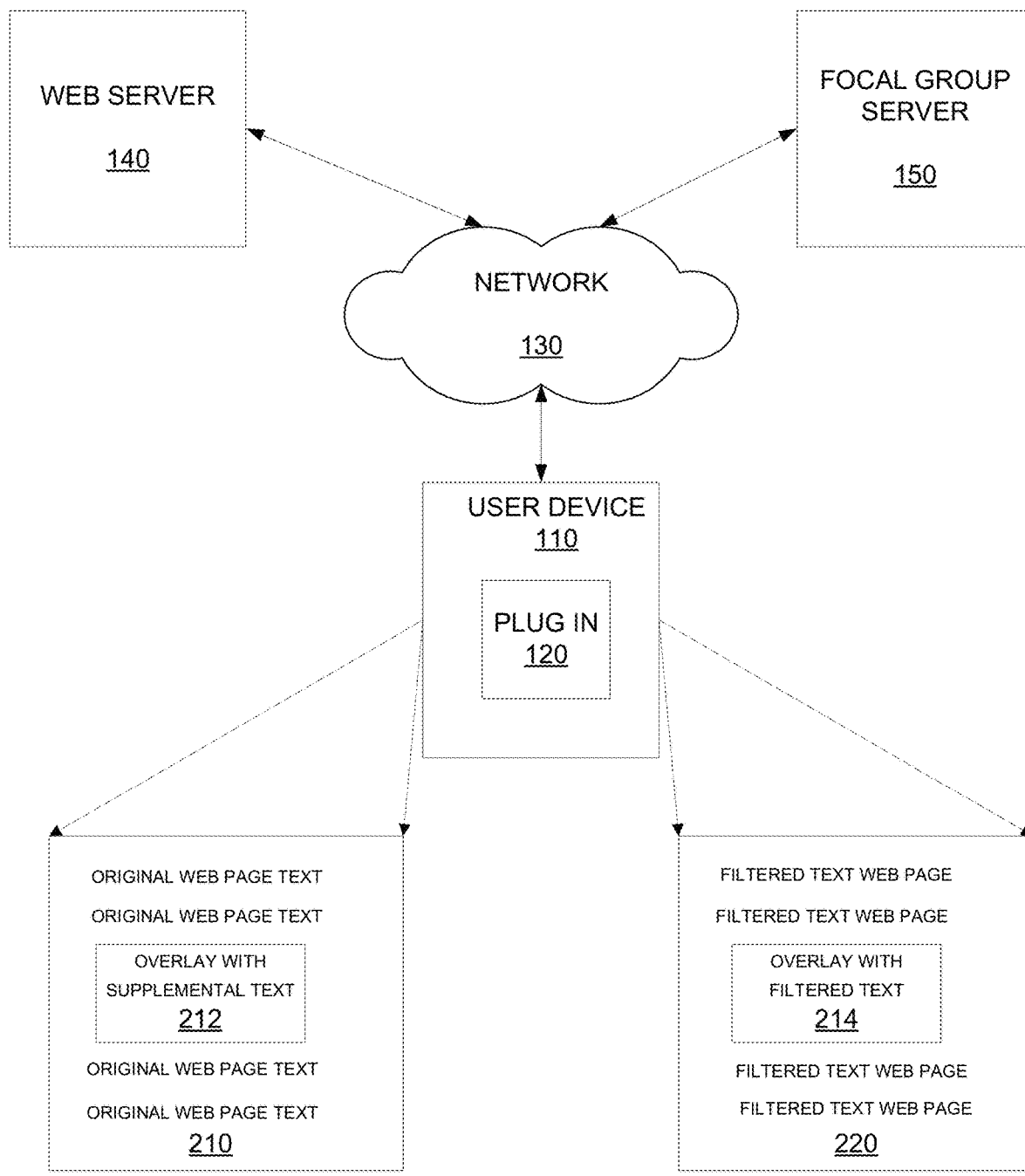
FIG. 2 shows the computing device of FIG. 1, and examples of supplementing web pages being browsed by the user.

FIG. 2 shows the computing device of FIG. 1, and examples of supplementing web pages being browsed by the user. FIG. 2 includes two exemplary web pages 210, 220 that have been supplemented by information of a focal group.

The web page 210 provides an example of a web overlay that supplements a web page being displayed by the computing device 110 by providing additional information to the display that is, for example, related to the information of the original web page being displayed by the computing device. In an embodiment, the original web page can be analyzed using one of a semantic language technique or an image recognition technique to determine contextual information for the web page. The additional information provides the user with related information from a more likely to be trusted source (the focal group). The web page 210 as viewed by the user includes the original web page text, but additionally includes the overlay 212 that includes supplement text that can be related to the information of the web page. The supplemental text of the overlay is derived or based on the information associated with the members of the focal group.

The web page 220 provides another example of a web overlay that supplements a web page displayed by a computing device 110 by filtering information of the web page 220. That is, based on the information of the focal group, information of the original web page is filtered, thereby providing the web user with a better presentation of the original web page based on the information of the members of the focal group. The overlay 214 can include filtered or sorted information of the information associated with focal group. For one embodiment, the sorting and/or filtering of the information associated with the focal group is based on the information of the web page 220. That is, either or both the information of the web page, or the information presented by the overlay 214, can be filtered and/or sorted based on the other of the information of the web page and the information presented by the overlay 214.

Figure 3:
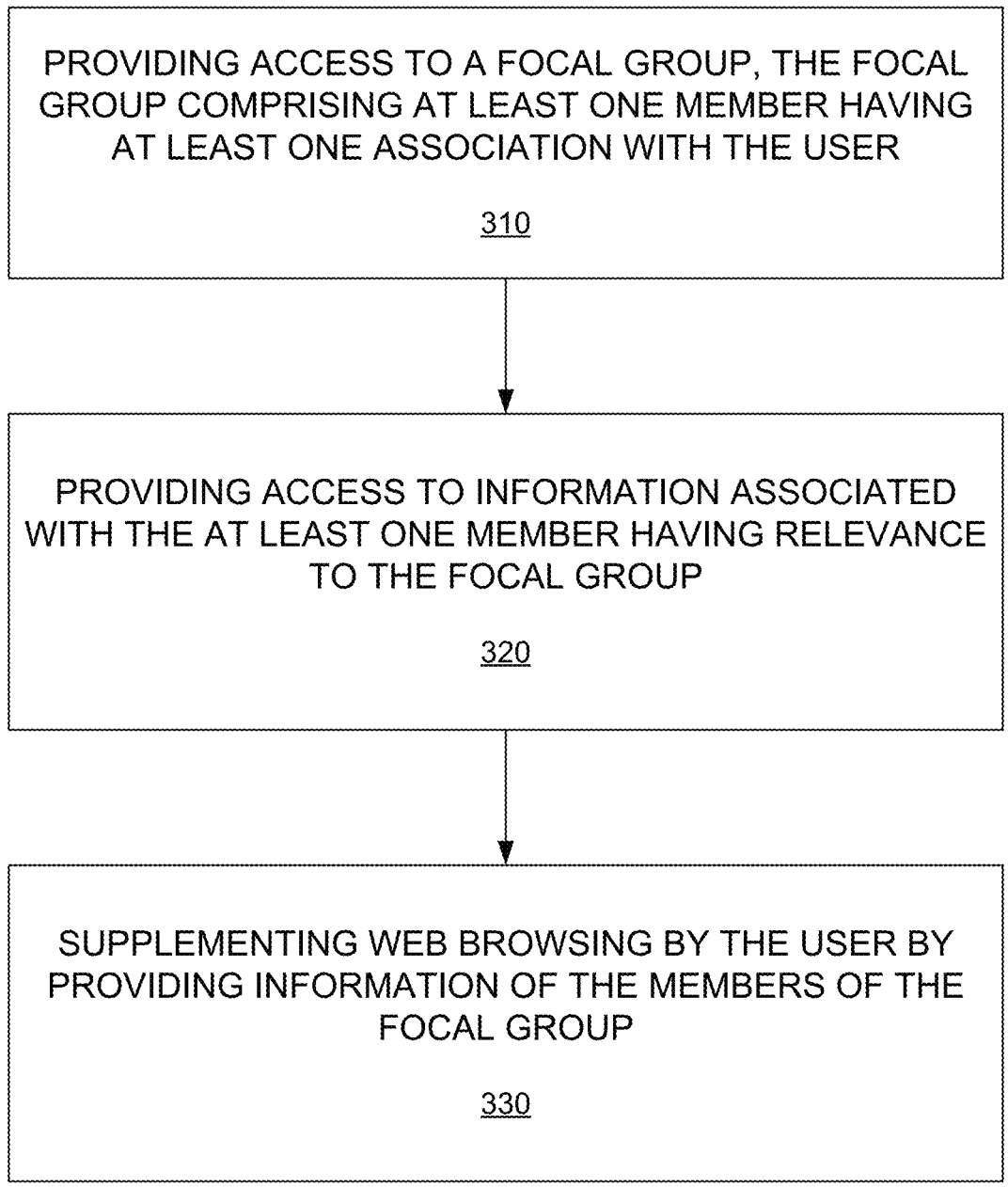
FIG. 3 is a flow chart that includes steps of an example of a method of supplementing a user's web browsing.

FIG. 3 is a flow chart that includes steps of an example of a method of supplementing a user's web browsing. A first step 310 includes providing access to a focal group, the focal group comprising at least one member having at least one association with the user. A second step 320 includes providing access to information associated with the at least one member having relevance to the focal group. A third step 330 includes supplementing web browsing by the user by providing information of the members of the focal group.

As previously described, one embodiment includes a plug-in loaded on the user's computer, that when executed, supplements the user's web browsing. A more specific embodiment includes the plug-in providing the user with a web-browser overlay. Execution of the plug-in provides the user with the web overlay that supplements web browsing by the user. More specifically, one embodiment includes the web overlay providing the information associated with the at least one member that has relevance to the web browsing of the user. Other embodiments include the web overlay filtering, and/or sorting information of, for example, a web page based on the information associated with the at least one focal group member. In yet another example, the web overlay can emphasize the content or interface with an identifier, wherein the identifier is related to the information associated with the at least one member. For example, the identifier can include a graphical representation of a focal group member, including in various embodiments icons, images, videos, emojis, memoji, animated selfies, or other markings or content (still and/or animated) that can that be used to provide a visual representation of a focal group member.

For proper operation, the plug-in has access to the focal group, and to the information associated with the at least one member of the focal group. As previously described, the access can be through a network connected to the user's computer, and to one or more servers that maintain the members of the focal group, and the information associated with each of the users of the focal group.

As previously described, an embodiment for supplementing the web browsing includes an overlay. Based on information of, for example, web page being browsed by the user, an embodiment includes the overlay providing at least some of the information of the at least one member of the focal group. The web browsing of the user is supplemented by providing the user with focal group intelligence. That is, the information provided by the overlay enhances and improves the user's web browsing by providing the user with additional intelligence as provided by the information of each of the members of the focal group.

One embodiment includes the information provided by the overlay relating to information of a web page being browsed by the user. That is, the overlay supplements the web browsing by providing additional information (focal group information) that is related to the information being provided by the web site. Additional information can include, for example, past experiences of one or more of the focal group members, and/or recommendations by the one or more focal group members based on the past experiences.

The overlay can additionally or alternatively use the information of the focal group to filters information of the web browsing. That is, the information provided by web browsing can be filtered based on the information of the focal group. All of the information provided be a web page may not be useful, and the user's web browsing can in some situations be improved by filtering the information of the web page. One method of filtering the information includes filtering it based on information of the members of the focal group.

For example, a user can visit on online book store and view a page displaying a set of books. However, if the user has the overlay plug-in enabled, the displayed set of books may be a subset of the original results of the query, wherein the subset displayed is based on the filtering performed by the overlay plug-in. That is, for example, only the books owned or reviewed by members of the Focal Group, or by members having a certain affinity to the user or proficiency in the subject matter may be displayed.

The overlay can additionally or alternatively use the information of the focal group to sorts information of the web browsing based on the information of the at least one member of the focal group. That is, the information of the web can be sorted based on the information of the focal group.

For example, a user can visit a website that provides restaurant reviews, and the user can submit a query to find a good restaurant in a particular area. Originally (without the overlay), the results of the query that are returned by the website, for example, is sorted by ratings given by random reviewers. However, if the user has the overlay plug-in enabled, the sorting of the displayed results is further improved by strategically positioning the reviews produced by the members of the user's focal group who have high affinity or high proficiency in the subject (restaurant knowledge).

The overlay can additionally or alternatively filter the information provided by the overlay based upon the information of the web page. For example, if a user is visiting a photography website, one embodiment includes the overlay plug-in displaying information about only those members of the user's focal group that have relevance to the browsed page(s) in the photography website. For example, a user looking at a camera review of a website views (on the display) only the information of those members of the focal group who have reviewed or own the camera.

An embodiment of the overlay includes highlighting at least one web page with visual identifiers. The visual identifiers are related to the information associated with the at least one member having relevance to the focal group.

For example, if a user is browsing products at an online tennis gear store, each product can be visually annotated by the overlay plug-in with icons that reflect information from the focal group relevant to that product. Furthermore, the user can be allowed to click on (select) an icon to submit the information about the product he/she would like to be reviewed by the focal group.

It is to be understood that the visual identifier can include any one of many different implementations. That is, for example, the visual identifiers do not have to be icons. Additionally, other types of iterations between the user and other focal group members can be initiated by the visual identifiers.

For another example, the visual overlay depicts the affinity map of the user with the members of the focal group and highlighting those members that are relevant to the browsed page. Exemplary affinity maps are provided in FIGS. 4A, 4B.

Another embodiment of the overlay further includes at least one of fetching or requesting the information of the at least one member of the focal group. For example, a user may click on icon provided by the overlay next to a product to request a specific member of the focal group to provide an opinion or a review about the product. This embodiment is very useful because it enables rapidly growth of the information of the entire focal group network, therefore making the overlay more powerful. Another embodiment allows, for example, a user to click (select) an icon, allowing the user to customize a review form and send it to members of the focal group.

It is to be understood that there can be methods other than the use of an overlay for at least one of filtering, sorting or appending information to information of a web page based on the information associated with the at least one member. That is, an overlay as shown and described here is one method of supplementing web browsing. Other methods of supplementing web browsing based on the information of a focal group are also possible.

An embodiment includes ranking the information associated with the members of the focal group. The general reasoning being that higher ranked information can have a greater influence on how the web browsing of the user is supplemented. For example, one focal group member may be identified as being a particularly good expert on the subject matter of the web page being accessed by the user. Accordingly, an embodiment includes the information associated with the at least one member having relevance to the focal group, being ranked by a level of importance. For one embodiment the ranking of the level of importance of information is influenced by a perceived level of importance of each of the at least one member associated with the information. Other embodiments include the perceived level of importance of each of the at least one member being influenced by at least one of a member rank on a relevant topic, a level of affinity between the user and each member, a level of expertise of each member, a level of trust of each member, a level of performance of past information provided by each member, a level of proficiency of each member.

One embodiment includes the affinity between the user and each focal group member having substantial influence over the ranking assigned to each focal group member. This can include, for example, the level of affinity between the user and each member adaptively varying over time based on actions of each member, or the user. If, for example, the user has elected to enable the overlay plug-in access to the user's web-email account, then the overlay can infer changes in the affinity between focal group members based on, for example, how often the members send e-mails to each other. The affinity levels can fluctuate over time, based on increase or decrease of e-mailing activity between focal group members. It is to be understood that inferences of affinity variations are not limited to e-mail interactions between users. That is, other types of interactions between focal group members can influence the affinity between the members as well.

Another embodiment includes executing at least one focal group application within a web browser based on information of the members of the focal group. One example of a focal group application includes executing the at least one focal group application comprises requesting additional information from the members of the focal group. That is, for example, the user can invite or solicit another member of the focal group to provide a review/opinion about something. One embodiment additionally includes overlaying the focal group application(s) over a web page being viewed by the user.

One example of a focal group application allows a user to join a focal group purchasing consortium to negotiate a better price with any vendor. A vendor can be any online store, as well as any focal group member. For one embodiment, a vendor can join a focal group and offer group discounts to focal group members. The focal group application retrieves vendor information relevant to that product and displays it to the user browsing another web page with relevant products or information (such as, pricing, targeted ads, or "sponsored" focal group results).

An example of a focal group overlay application includes an overlay browser plug-in installed into a user's web browser, and a focal group overlay web server. An exemplary embodiment of the focal group overlay web server includes focal network application business logic, a database, an application programming interface (API), and connection to a friend network provider. The focal network application business logic can include a layer of software code that embodies the actual logical rules related to updating and keeping current all focal group relations, data, and information. The layer of software code includes "business logic" as opposed to the other layers of the code that include common frameworks, web and database infrastructure. The database provides storage for focal group contents and focal group information. The API provides communication to the overlay plug-in. The connection to the friend network provides a connection to at least one of any available social networks.

The described embodiments can be illustrated by one example (a user browsing a catalog of products on an online store) of providing a user with a web-browser supplement. Initially, a user arrives at a merchandise selection webpage in an online store. An overlay plug-in sends a uniform resource locator (URL) of the browsed page to a focal group overlay web server, invoking a corresponding API call. In response, the focal group overlay server sends information parsing rules that allow the overlay plug-in to analyze the content of the page. The overlay plug-in analyzes the web page and parses the identity information about each particular product, such as product brand, product title, product model, serial number or PLU or barcode. The overlay invokes another server API call, passing the collected information to the focal group overlay web server. The focal group web server can respond, for example, with multiple lists for each identified product on the page.

An exemplary list can include a list of "experts". That is, members of the focal group sorted by highest proficiency, with names, photos and other information about each member, including any related product reviews created by these members.

Another exemplary list includes a list of "close friends". That is, members of the focal group sorted by highest affinity, with similar information for each member.

Another exemplary list includes a list of "actions" related to this product. The actions list can include a "request review" in which a user is able to ask one or more members of a focal group for an opinion/review of this item. Other action lists can include, for example, a "Submit review" in which a user can provide his/her own review, an "I own it" in which a user can let other members of the focal know that he/she owns this item, a "Rate it" in which a user provides a "thumbs-up/thumbs-down" type of quick voting button, to let the user cast a rating vote about this product, an "Add to wish list" in which a user can let other focal group members know that this is an item he/she doesn't mind receiving as a gift, and a "Group bargain" in which a user can add him/herself into a group of people who want to team up for buying this item at a bulk discount.

As previously described, the focal group overlay can include focal group applications. The focal group overlay can include, for example, an action button (or icon) that invokes a specialized focal group application. The plug-in can render (creates visual elements for), for example, two lists of focal group members (reviews of experts & reviews of friends) as well as action icons/buttons that enhance the currently browsed page. The resulting page that is displayed to the user, is a merge of the original product page, as sent by the web server of the online store, plus the elements created by the overlay plug-in. The additional visual elements (pictures of focal group experts/friends and action buttons) are displayed next to the related product items on the page. The user can click on (select) any friend or expert's photo or name and read the review or rating for each product. Additionally, the user can click on any "action" icon to invoke the corresponding action. This way, the user is able to use the knowledge of his/her focal group to help decide on the purchase of a product. Using the "action" icons, the user contributes to the knowledge of his focal group (e.g. by providing his/her own review, or by requesting a review).

An embodiment of the web-browser supplement allows, for example, third party developers to add their own focal group applications. One example of a focal group application includes a mini-button, or an icon displayed next to any item on the page that is recognized by the overlay as a target item (i.e. around which the overlay creates some enhanced content, or filtering, or sorting). Additionally, a set of configuration directives specifying the kinds of items (products, services, etc.) that this application are enabled for one or multiple web-pages of the application that augment the existing web-pages within the focal group overlay web server. The existing web-pages are the web-pages that the users see when they click on the mini-button. These items can be uploaded by a focal group application developer to the focal group overlay web server via, for example, a special application-registration form.

For an embodiment, all focal group applications, including those provided within the focal group overlay website by default, use the same API to retrieve and manipulate focal net information. The focal group API provides the focal group application with access to the focal net information. The focal net information can include, but not limited to, social graph links, affinity and proficiency information, user profile information (as restricted by the user's access preferences), focal group affiliation, user-created reviews, ratings, and/or any user-related information contributed/created by other focal group applications.

Another embodiment includes providing user web browsing results to other websites, and mining additional information from the other websites for additionally supplementing the web browsing by the user. For example, if a user is looking at a camera of brand "A" in an online photography store, the focal group application can send relevant information to a camera-maker company of brand "B". The camera-maker company can then send competitive pricing information on the same or comparable product. The information about camera "B" can then be presented to the user browsing information about camera "A" via overlay's enhancing the web page. As a result, the user is better informed about comparable products.

As previously described, the information associated with member of the focal group can be adaptively updated. For example, one embodiment includes adaptively updating the information associated with the at least one member based on web browsing of the user. Another embodiment includes adaptively updating the information associated with the at least one member based on web browsing of the members. For example, if a focal group member is considered an expert in tennis (that is, has a high focal group proficiency rating) and is buying a tennis racquet in an online store, the information about the purchase may be considered useful, and therefore, is sent to the focal group and appended to the rest of the existing focal group information.

Figure 4A:
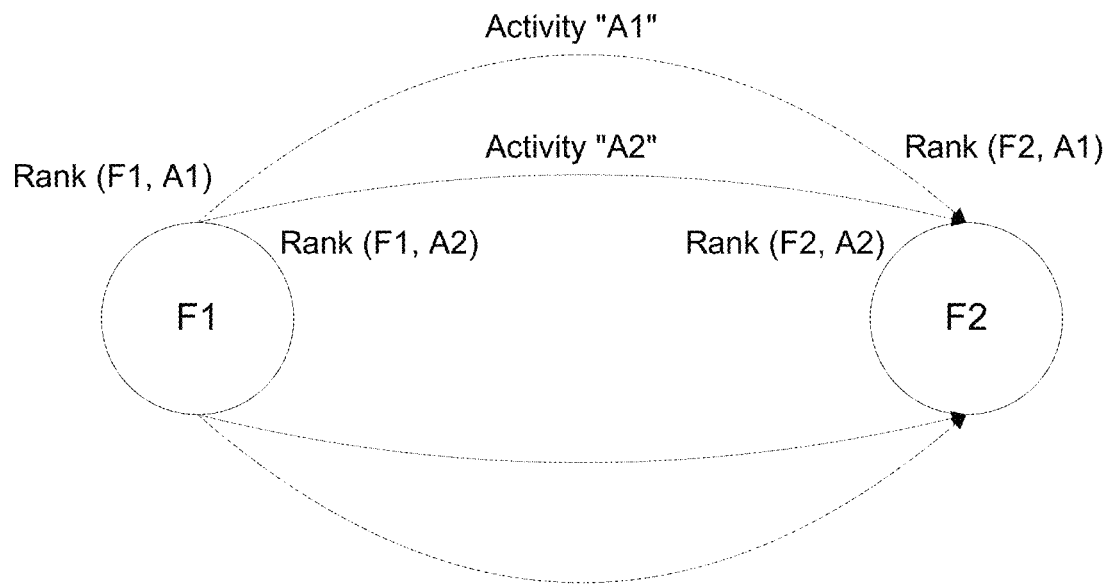
FIG. 4A shows an example of a visual display that can be used to adaptively depict relationships between a user and members of a focal group.
Figure 4B:
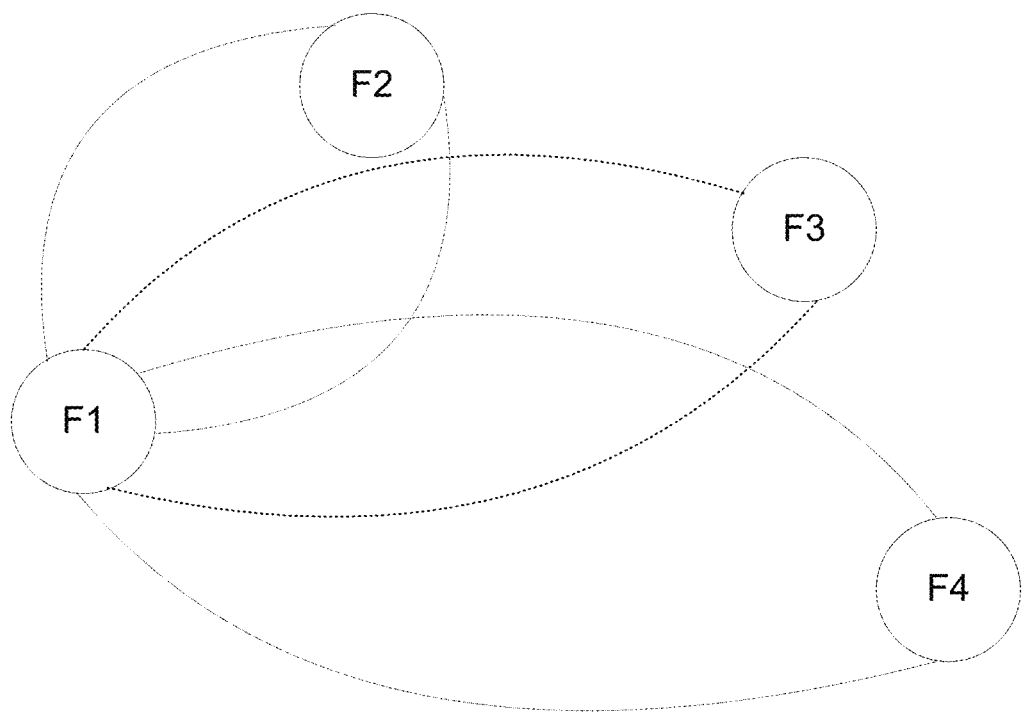
FIG. 4B shows another example of a visual display that can be used to adaptively depict relationships between a user and members of a focal group.

FIGS. 4A and 4B show examples of visual displays that adaptively depict the relationships between a user and other members of a focal group. The relationships depicted can include, for example, the reliability of one member of the focal group, or an affinity of members of the focal group with a user.

FIG. 4A shows a first focal group member F1 and a second focal group member F2. As shown, the first focal group member F1 has a first activity A1 (for example, playing tennis) involving the second focal group member F2, and the first focal group member F1 has a second activity A2 (for example, purchase of a product) involving or associated with the second focal group member F2. Based on the activities between the focal group members, rankings of the focal group members can be influenced. The rankings can represent the reliability and/or the affinity of each member with other members of the focal group. Clearly, the ranking can adaptively vary over time as interactions between the focal group members occur.

FIG. 4B provides another depiction of the relationship(s) between focal group members and provides a relative strength of the relationship(s) between the focal group members. As shown, the first focal group member F1 has varying degrees of closeness with the other focal group members F2, F3, F4. The "closeness" can depict an affinity between the first focal group member F1 and the other focal group members F2, F3, F4. As shown, the first focal group member F1 has a high level of affinity with the second focal group member F2 because the two members are depicted as being closer to one another. The first focal group member F1 has a lower affinity with the fourth focal group member because they are depicted as being farther from each other. This display provides an informative method for a focal group member to establish the levels of affinity between the focal group member and other focal group members.

It is to be understood that the displays of FIGS. 4A, 4B are merely exemplary, and that other displays can alternatively or additionally be used to visually display to a user the strengths of relationships between the user and other focal group members.

Figure 5:
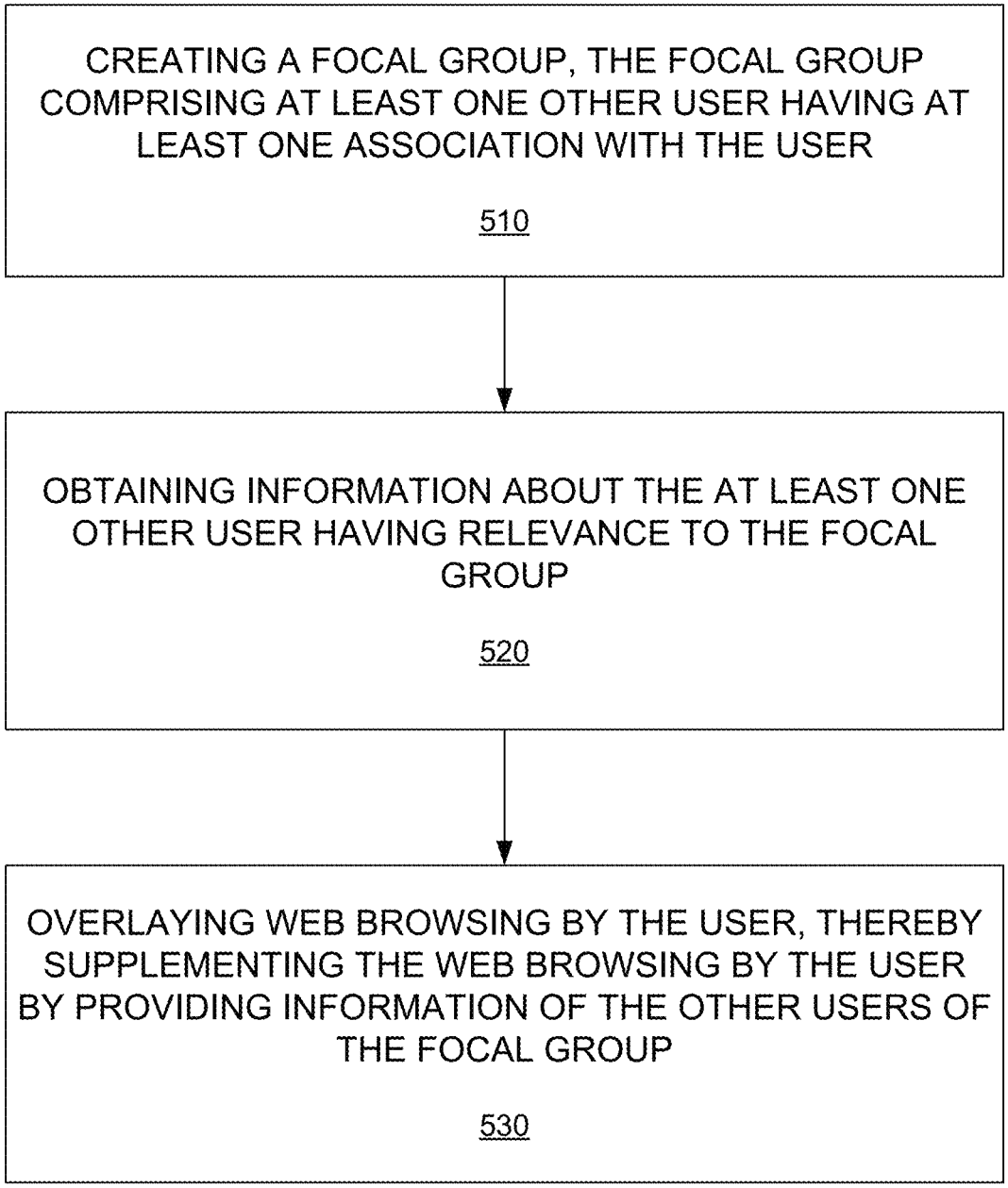
FIG. 5 is a flow chart that includes steps of an example of a method of overlaying web browsing with focal group intelligence.

FIG. 5 is a flow chart that includes steps of an example of a method of overlaying web browsing with focal group intelligence. A first step 510 includes creating a focal group, the focal group including at least one other user having at least one association with the user. A second step 520 includes obtaining information about the at least one other user having relevance to the focal group. A third step 530 includes overlaying web browsing by the user, thereby supplementing the web browsing by the user by providing information of the other users of the focal group.

As previously described, the overlay can be a plug-in that can be loaded on a user's computing device. The overlay enables a transformation of the state of information displayed on the user's computing devices, thereby supplementing the displayed information based on information of the other users of the focal group.

Embodiments as Disclosed by Provisional Application

Web 2.0 has connected individuals thru a mesh of social networks, portals, commerce sites and forums. Many of these sites attempt to model relationships to facilitate commerce and build recommender systems.

Yet absent from the web is a general, utilitarian mechanism that mimics interpersonal trust and reference networks. Imagine you need to find a babysitter, a heart surgeon or a plumber to remodel your bathroom. One turns to trusted friends to obtain references, since these providers involve the well-being or health of your family, or a significant amount of money (and typically frustration) in the case of the remodel.

A more mundane example is attempting to screen references for internet purchases like books or camera lenses. Amazon has an excellent mechanism for consumers to review books, but is the reviewer's opinion and taste relevant to you? Dpreview.com has an excellent forum with contributions from skilled photographers, but who are these reviewers? Any recommendation from a friend with similar taste in reading, or from a prosumer photo hobbyist, is trustworthy. How does the unknown reviewer on the internet compare?

Your friends, or their friends, have the recommendations or references you need; they just aren't available on the web. Three mechanisms are essential to securing a reliable reference or recommendation: trust, ranking/proficiency and a recommender system. A useful recommendation will be from someone you trust, with relevant expertise and experience, and similar taste or values.

A Web 3.0 solution that addresses this void would provide immense value to internet users and represents an unparalleled business opportunity.

To be useful to users on the internet, the solution would need to overlay the internet with the social applications that bound a user to the activities, references and tracks left by the user's social networks. We describe this as a Social Application Overlay, since the overlay would overlay any internet website, combining the target website with the user's social networks through a variety of unique mechanisms. This would allow a user to leverage his social networks from any website.

Figure 6:
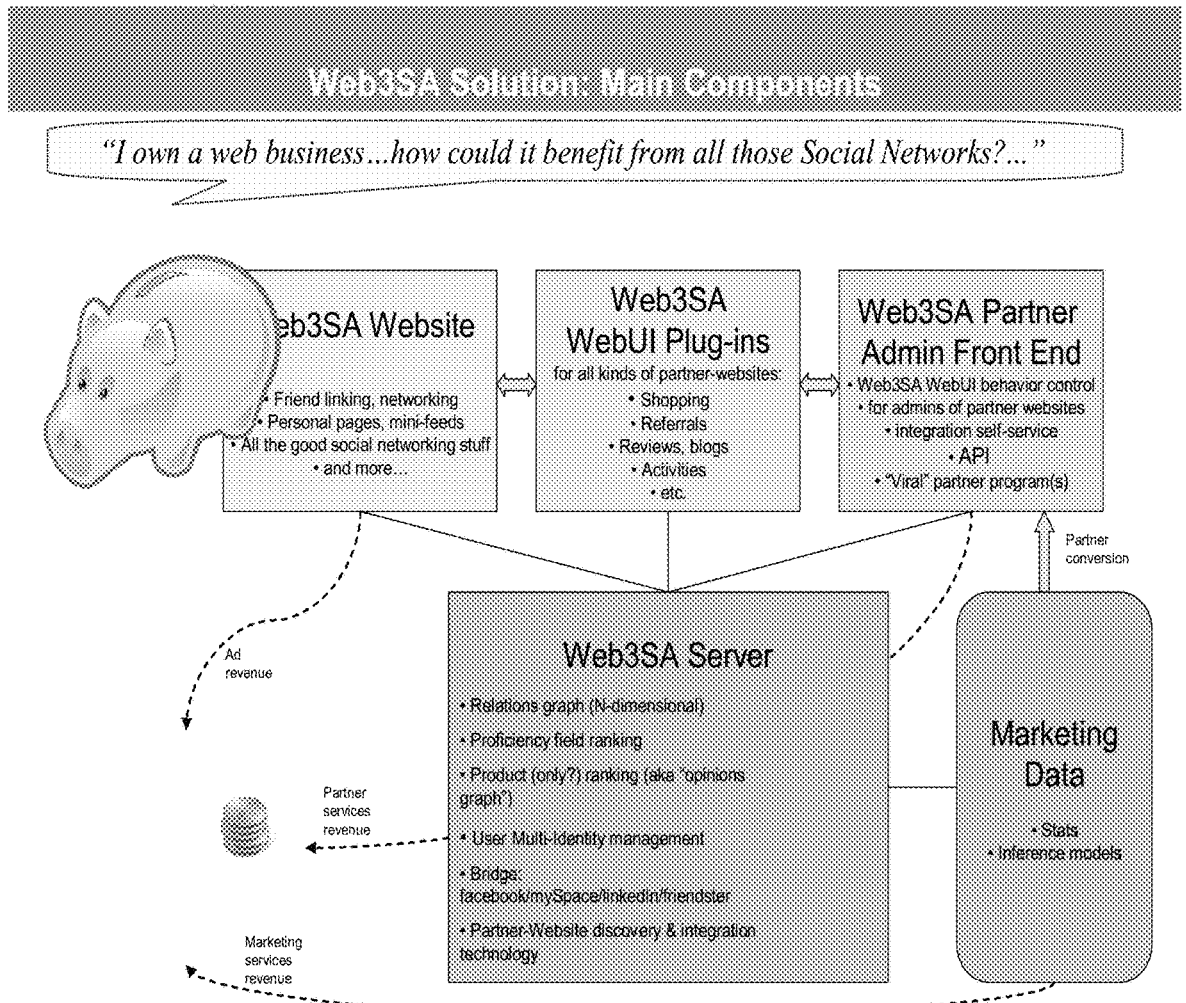
FIG. 6 shows a Social Application Overlay, according to an embodiment.

FIG. 6 shows a Social Application Overlay, according to an embodiment. The solution has the following components:

A user's aggregated social networks—his/her social graph (SAG)—of trusted contacts, split and refined into specific Focal or Activity Networks, or FN and AN. This would connect users into categorized activities or focus areas, as opposed to broad, flat SNs.

A website would be used to manage these FN, and will allow users to import existing contacts from social networks, email programs, etc. The closest solution available currently is LinkedIn with its degrees of separation and ability to leverage your contact network; of course, the FNs would support ranking and categorization that is not available on LinkedIn.

Social applications relevant to any activity in the FN. Examples include mini-feeds of reviews, purchases, website recommendations and annotations, shared by the members of that activity.

An internet-wide social application overlay, or SAO, which lets a user access and leverage his social network and applications from any website. The SAG becomes an overlay on the internet and provides immediate access to all of the applications and attributes of the FN, and simultaneously provides an FN based "frame of reference" to any web content.

Ranking and recommendation system based on the trust inherent in the FN, that measures activity-specific proficiency of users (ranking) and both product and service references (recommendation) for specific categories. The closest solutions available today are sites like Yelp, Angie's List or the Berkley Parents Network; however, these sites have no trust network hence recommendations are from strangers, unless you invest considerable time reviewing their contributions and assessing the contributors.

Programmatic APIs that allows partner websites to leverage the entire FN and SAO. Two APIs are supported, one to allow website integration with the FN (FN-API), and a second to allow development of SA on the FN (FN-SA-API). Websites with relevant content and databases of users can immediately create FN based social networks which can be accessed from and integrated with the website, either transparently or tightly coupled. This provides four benefits to the website:

an instant social network access to the larger SG and FN community the viral marketing (thru the FN) that will drive more users/consumers to that site, and the promotion of specific products endorsed by the community revenue sharing of product/service/advertisement accessed thru the FN community SAO.

Data mining of existing websites, social networks and databases to interact with the FN-API. Data can be used to update the social applications in the FN, for example to rank and recommend people and products.

Facebook and OpenSocial solutions to allow users of existing SNs to integrate with the FN.

Ecommerce site integration, (Amazon web services)

The Web3SA Social Application Overlay—SAO

The SAO allows access to any FN SA or service from any internet website.

This unique technology allows a user to leverage his FN at any page on the internet. The technology recognizes a range of relevant items on any web page—Web 3.0 objects, URLs, tags—and provides relevant FN services to each item or object. This technology is completely client side, so can operate transparently on the website.

At a webpage, plug-in and icon technology is used to identify objects recognized by a user's FN as relevant, or to operate on the object with FN services. For example, a user browsing for a product on an ecommerce site will see FN icons for known reviewers or for reviewed/recommended products. If the user selects the icon for a reviewer, a Web3SA frame will contain that reviewer's FN profile relevant to that category. Similarly, by selecting a product icon, a Web3SA frame with relevant reviews is displayed.

The range of object services includes, but is not limited to
Show FN reviews about the visited site and/or product/service used
Which friends have recently visited this site (or currently visiting), bought/used this service/product, or other related sites, products or services (this is on an opt-in basis to respect friends' privacy).
Add a site/URL review
Review/recommend products to FN
Rank a user
Request product review from FN
Share object with network
Show or search for similar services and products available from other Partner sites
Buy product from FN vendor
Annotate for FN or a particular user. Mark this page/product/service/website to be noted by friends (specify which FN or friend)
Read object annotation
Add to wishlist, save list, etc.
"Other people who used this site/product/service, have also used this other site"—a-la Amazon's suggestion of other books to buy. Although this is non-FN, it can be a value-add for the user, because "wisdom of the crowd" is useful even if it is a crowd of unfamiliar people.
Turn SOA Icon services on/off,
Turn SOA object icons-highlights on/off—to highlight all relevant objects
navigate into the main Web3SA website While the list above appears overwhelming, simplicity of use is key, and services are tied to context and objects. Only the relevant services are available at the appropriate part of the target webpage.

These object services are generally invoked by selecting an icon, or by highlighting text and mouse-clicking it, which in turn generates a pane/frame in—really above—the client browser. The icons can be embedded at partner websites, enabled for all objects, or will appear when rolled over. The frame appears above the web-page and contains the relevant FN services that operate on/with that object.

The Web3SA Plug-in and Widget

Each Web3SA has access to the SOA thru the Web3SA plug-in, which the user must install in his browser.

Once installed, the user has access to an ever-present icon—the Web3SA Widget—hovering over any web page that the user navigates to. The widget may be on the page, or on the toolbar. The Web3SA widget can expand to a small window on mouse-over or mouse-click; the window has options to control SOA services on that web-page, typically to control SOA services available at that page, general SOA settings, or to navigate thru FNs, SAs, or to access the Web3SA site. Services that require frames are presented in a Web3SA frame.

SOA Services at Websites

The SAO services available on a website are split into three categories, depending on the level of integration of the website with the SAO:

Integrated—this website has been enhanced to interoperate with the FN-API and can therefore run SAs that leverage the FN
Targeted—prominent web properties that the FN recognizes, with specialized support for the target service Standard—the standard SOA operates on all other websites Standard Websites No integration with the website is necessary; all FN services are delivered thru client-side browser technology, and all services are completely transparent to the web-server. FN services are delivered in a separate frame with no interoperability with the original web-page.

Even with this limitation, comprehensive FN services are applied to objects in the served page.

Targeted Web Sites

Web3SA will develop additional services to enhance user experience at prominent websites.

Search

Possible FN services on results for google search include:
highlighting pages with relevant FN content
filtering pages based on FN SA criteria
FN partner ad placement Ecommerce FN services will be targeted for ecommerce content.

Integrated Websites (FN Partners)

Partners that integrate the FN APIs can invoke FN services or write SA for FN SNs. The website and web-server will incorporate embedded icons/services/SA that can be used to enhance the richness of the user's experience. For example, products on an ecommerce site can restrict reviews to the user's network, or to reviewers with a certain proficiency.

SOA Usage Scenarios

In this scenario, a user will leverage his FN photography network while browsing for a camera at an ecommerce website, say Amazon. The scenario goes thru the following steps:

1. Setting product and reviewer filters for proficiency and affinity utilizing the Web3SA Widget.
2. Finding the SOA icons for the product and reading the reviews in the Web3SA frame.
3. Finding the SOA icons for the reviewers and reviewing their profiles (in and out of FN) in the Web3SA frame.
4. Selecting the Partners Icon and reviewing offers from these partners (other ecommerce vendors) in the Web3SA frame.

Setting Filters for Proficiency and Affinity

The Web3SA widget hovers over the browser page; the user selects the widget and the Web3SA Settings Frame appears above the Amazon page.

The Settings Frame allows the user to control the placement and appearance of Web3SA icons on the browser page, set filters for affinity and proficiency for a variety of object services, including reviewer and product filters.

In this example, the user enables product, reviewer and partner icons.

Next, he sets product review filters at 8, set affinity at 7, and FN proficiency at 7, but FoF proficiency higher (since they are out of his network) at 9.

Once set, these settings influence the icons that appear next on the browser page.

Reading FN Reviews

Figure 7:
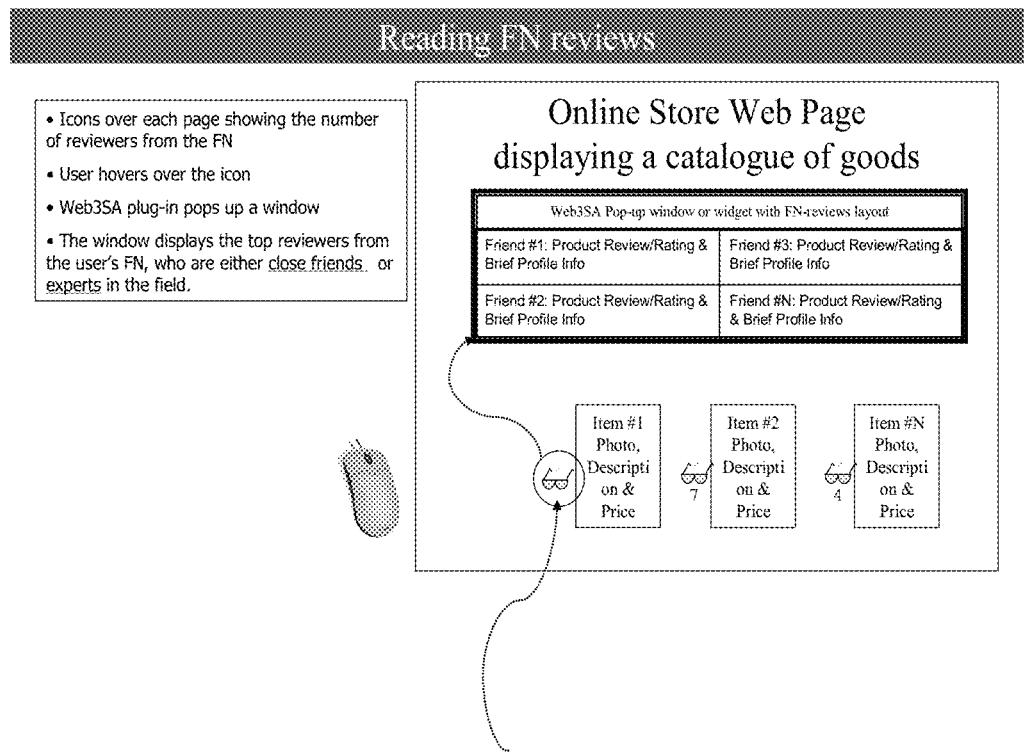
FIG. 7 shows an overlay that includes focal network reviews, according to an embodiment.

FIG. 7 shows an overlay that includes focal network reviews, according to an embodiment.

Figure 8:
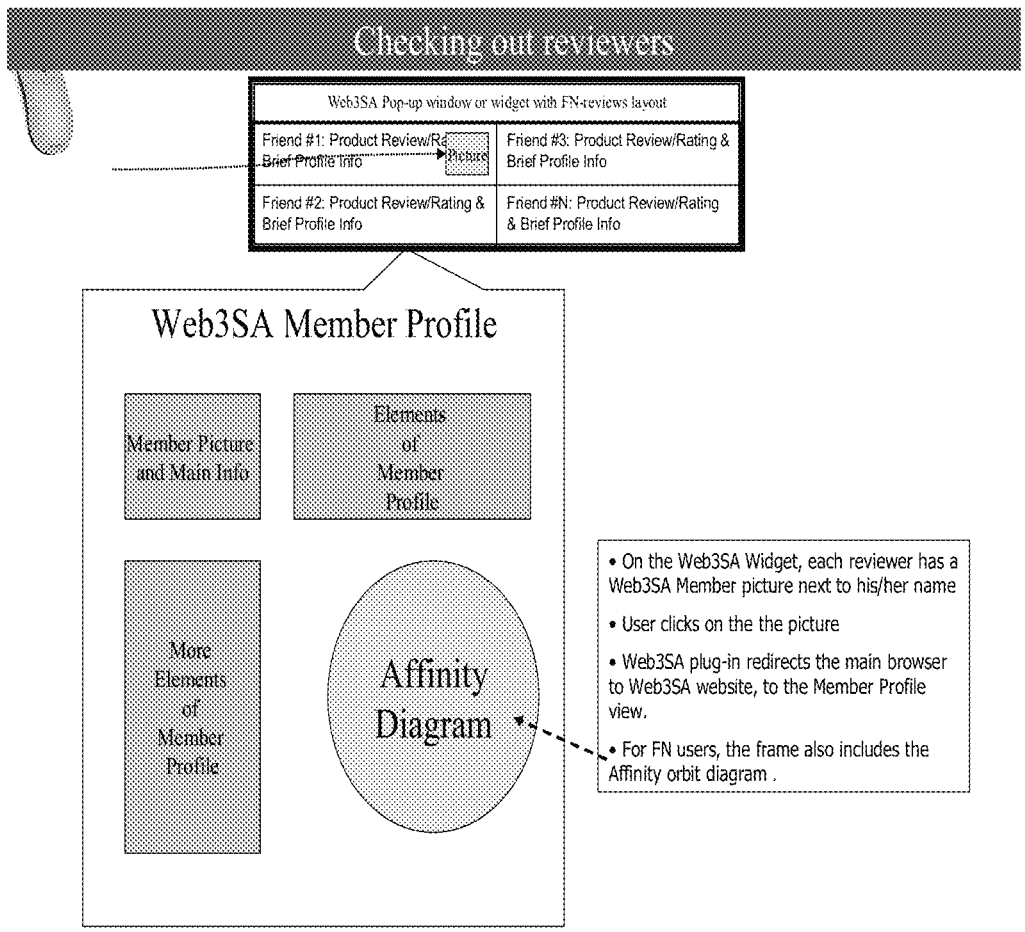
FIG. 8 shows an overlay that includes reviews of focal network reviewers, according to an embodiment.

FIG. 8 shows an overlay that includes reviews of focal network reviewers, according to an embodiment. Now, the Amazon page has icons over all products and reviewers (next to their names on the Amazon page) matching the filter criteria.

One of the cameras has a Review Icon; the icon has a count with the number of reviews meeting the filter criteria set in step 1. The user hovers over the icon and a Web3SA Review Frame appears with the reviews, sourced from the photo FN (from the Web3SA servers).

The user browses the reviews but needs more information about who these reviewers are.

Checking the Reviewers Out

Each reviewer has a Web3SA User Icon next to his/her name. The icons appear on both the Amazon page, and the Web3SA Review Frame.

Reviewers are either in the photo FN, or FoFs that match the filter criteria. The Web3SA Review Frame displays user profiles for each user. For FN users, the frame also includes the affinity orbit diagram. Other items on this frame include all icons relevant to navigating the FN.

Suggestions from Other Vendors

Figure 9:
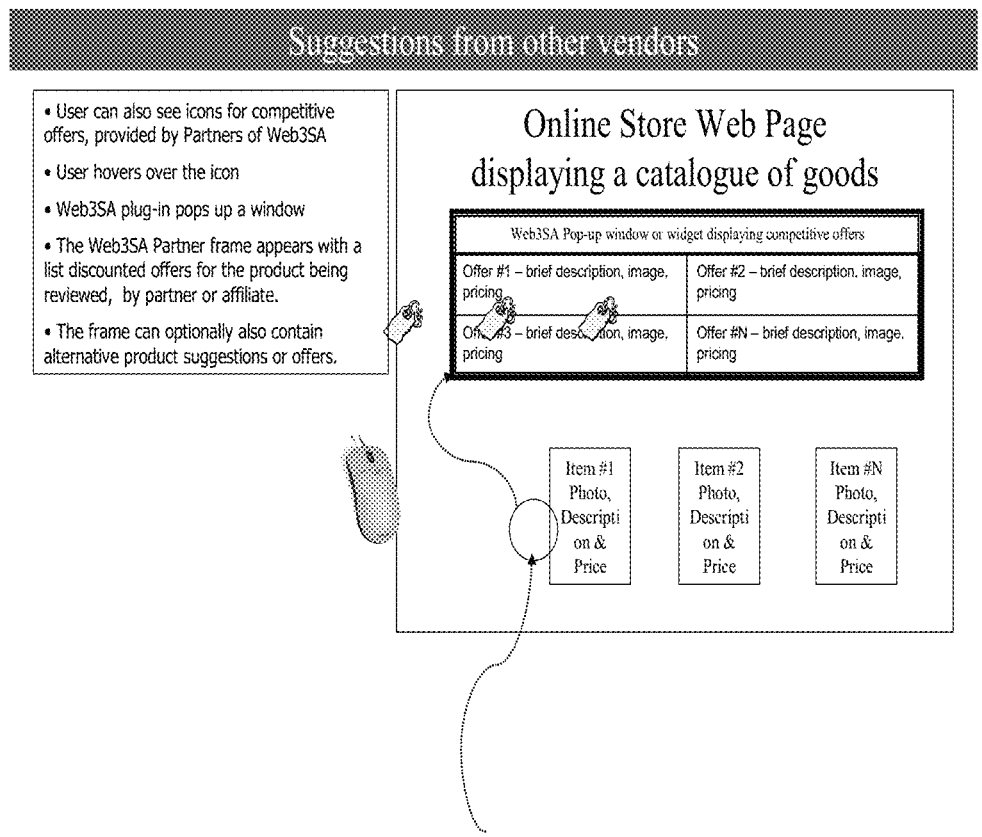
FIG. 9 shows an overlay that includes suggestions from other vendors, according to an embodiment.

FIG. 9 shows an overlay that includes suggestions from other vendors, according to an embodiment.

The user has access to the Partner Icon from both the Amazon page, and the Web3SA Review Frame.

This is consistent with the Web3SA navigation paradigm, that icons be available on both website and Web3SA frames, and that they be contextually relevant to the objects they service.

By hovering on or clicking the partner icon, the Web3SA Partner frame appears with a list discounted offers for the product being reviewed, by partner or affiliate. The frame can optionally also contain alternative product suggestions or offers.

Focal Networks

The Web3SA solution is a unique service that allows consumers to consolidate their focal and social networks at a single, independent site, and then leverage them from anywhere in the internet. Essential elements of the solution:
Consolidates social networks into one SG
Categorized networks by activity or focus (FNs)
Aggregation from other SNs, automated
Interoperable (FOAF, XFN compliant)
SG portability
Proficiency
Affinity within the FN
Extensible SA—The FN will also expose an API for development of additional SAs
Reference lists—people, service providers, products The core paradigm of the solution is that large, flat networks inherently consist of weak relationships, with limited utility. By grouping people into smaller networks, information and functionality is relevant to the focus of the network. In this way, the FN attempts to model a user's real-life relationships in the same way they are utilized in social interaction and bring the benefits of these relationships to the web.

These fine-grained networks are dedicated to the activity or focus, for example friends, family, hobbies, and interests. These networks are combined with SAs like group sharing and notification, mini-feeds, user proficiency ranking, product and service recommendation services.

Each FN is a $1^{st}$ degree network. The relationships between the FN owner and the members will vary, based on the strength of the connection, which we describe as an affinity. The affinity of each member places him in a relationship orbit around the owner. Over time, a member's orbits/affinity can change, based on the interaction between the two.

The Web3SA and FN Profiles

Figure 10:
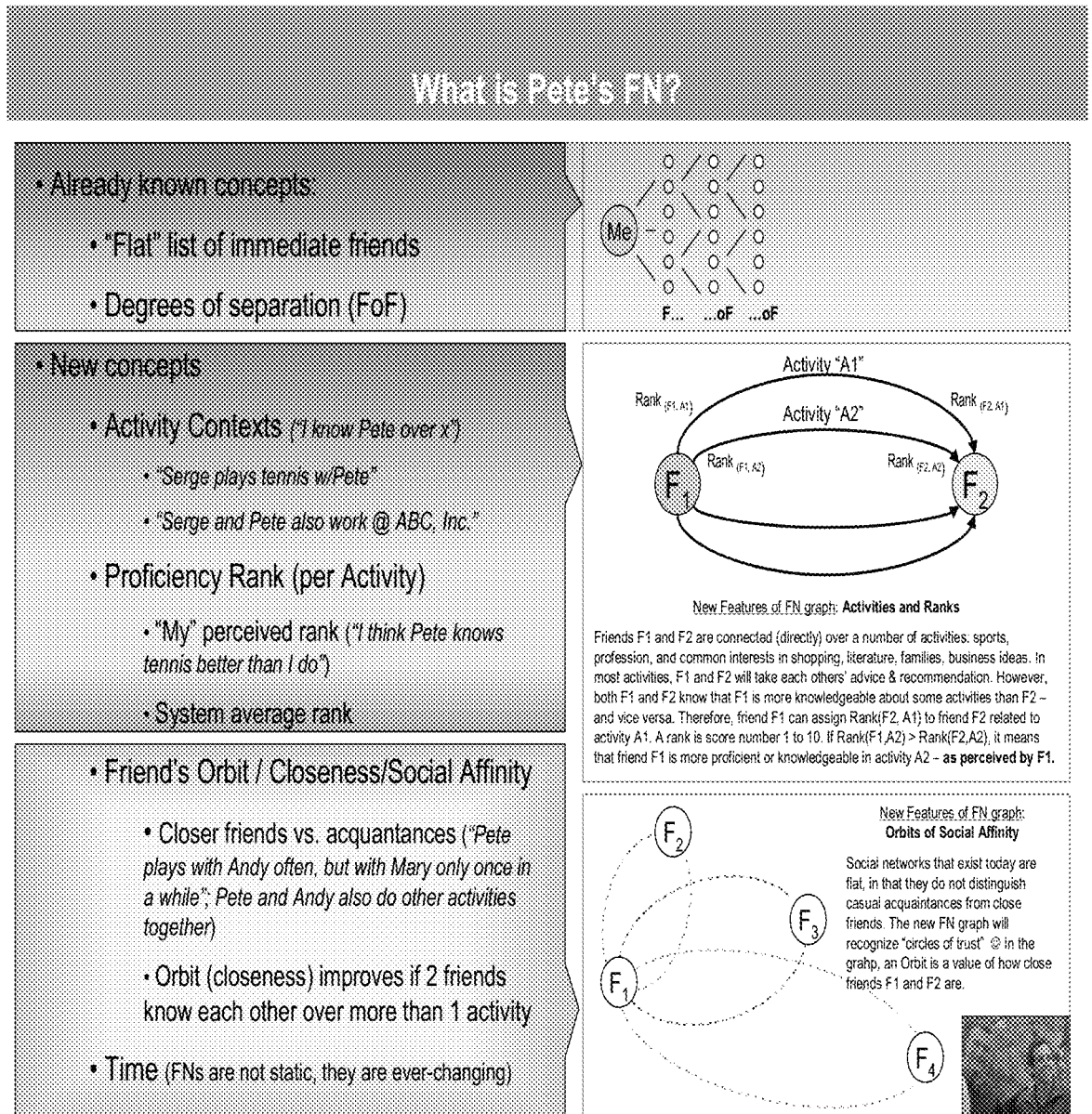
FIG. 10 shows an example of information of a user's focal network, according to an embodiment.

FIG. 10 shows an example of information of a user's focal network, according to an embodiment. A user's Web3SA profile contains:

The user's personal data
a list of FN
reference lists to service providers, products, people
his proficiency ranking for various categories, activities and FNs.
Each FN contains
members in the network
the affinity of each member to the user
Vendors, websites, services tied to this activity, membership with respect to these
mini-feeds
product reviews
object recommendations Each user will have the ability to create public and private profiles; in all likelihood, users will probably prefer to use different usernames to segregate public and private FNs and SAs.

Super-FNs

There are a number of "super-FNs" generated and maintained by Web3SA:
1. System Aggregated Social Graph (SASG). This is a user's complete social graph, generated from SN imported from other sites. The user can browse this SG and import individual connections into his/her existing FNs.
2. The worlds view of a user's FN's or SG—WVSG: The system will allow a user's connections, or even strangers, to edit the user's FNs and SASG, subject to permissions granted by the user. [IP].
3. Proficiency based FNs. A user can browse his FNs, and those of his network, searching for members with proficiencies in specific areas.
4. Vendor/website created FNs Managing FNs at the Web3SA Website FNs can be created at the Web3SA website or thru an FN-API from partner websites.

Users will be able to manage all of their FNs and SAs at Web3SA.com. FN management:
Building and managing FNs
inviting contacts to join FNs
importing contacts or SNs into their SASG
Viewing their WVSG
Managing system/partner generated FNs SA management
Managing and utilizing SAs on an FN
Importing, publishing and sharing SAs Reference and proficiency management:
Managing service provider references
searching the website for service providers Affinity Within a FN, affinity is used to model the proximity of the members to the owner of the FN. Each member has an affinity level, from 1 to 10, to the owner. Thus, members are placed in affinity orbits, a gradation/refinement of relationship within $1^{st}$ degree FN. FNs can be viewed in orbital diagrams, providing an exciting visual representation of the FN.

Affinity changes over time, based on interaction, bit also subject to owner overrides. [IP] The dynamic nature of the affinity model social relationships and is useful filtering operations within the SA. Other uses for affinity within SAs? Things that affect affinity levels include updates by partner website, level of interaction, etc. The owner can control this by marking a friend at a certain affinity, filter enemies/idiots.

Affinity is especially useful in personal reviews, since they capture the relationship of reviewer to user vs service provider so well.

Affinity in vendor created FNs?

Data Mining Existing Content into the FN

The internet has untapped, structured data that can be used to build Activity Networks or SA within the FN.

Utilizing the FN-API, websites can dynamically construct ANs for their users. At their next login, these users can then be presented with these AN which they can chose to use or discard. Current FN members can edit the AN and add to their existing SG, non-members can join the FN.

These AN are shared by the owners of the website and Web3SA; the AN and FN services can be fully integrated into the target website or be utilized in the FNSOA frame.

Web3SA, the website owner and the consumer all benefit. The website owner gets access to an SN and SAs; the site and brand are exposed and virally marketed to the extended FN community. The consumer benefits by incorporating another portion of his internet footprint into his FN. For data-mining, we classify websites in the following:
Sites where users have identity, interact and create relationships that can be classified into FNs with affinity-relationships.
Sites where users have identity, but with limited interaction between users. These sites can leverage FNs and utilize SA, but typically not create FNs.

Websites Examples
Activity based—Examples include oneclicktennis.com, Categorized/canonical databases that model user interactions. New connections can be built, and affinity and proficiency ranked. [Example: create new relationship when 2 tennis players have played more than N matches together, using the number of matches as an indicator of affinity and the tennis player Dynamic Rating as proficiency rank].

Ecommerce—(amazon.com, buy.com, newegg.com . . . ). At these sites there is limited user interaction, it is primarily user-to-website interaction. Thus, these sites' historical data contribute less to the creation of new FN, but can enhance SA and proficiency ranking. [Example 1: X buys a lot of books about subject M. His friends Y and Z can benefit from seeing X as "more knowledgeable" about subjects M and N, and elect to receive minifeed from all kinds of partner sites regarding X's activities related to subject M. Example 2: Recognizing who reviewers are, aka Elimination of the Stranger syndrome]

Ecommerce sites may create their own FN dedicated to shopping, style, reviews, etc.

Forums/communication/user-press—email, reviews, chats, blogs. In these sites, users do interact with each other via plain-English (or other lang.) communication. Thus, the exact nature of their interaction is harder to deduce and generally not structured into a data model, and it requires data-mining technologies such as natural-language semantical parsing. However, most such sites do offer a mix of both canonical/formalized DB records that can be directly mediated into new FN graph-building blocks, as well as "vague" natural-language interactions—text exchange, commentary, emails, editorials and user reviews [Example: user X who has exchanged 200 emails with user Y in the last 500 days is probably a good evidence that X and Y are at least acquaintances—we can infer this directly in the website's email-DB, without doing any NLP]

sites w/o user identity/login—(cnn.com?, etc.)—These sites lack SA content.

Reference and Recommendation on the Web, Solving the Stranger Syndrome

The FN will address the Strangers on the web Syndrome, by combining social graph and the SOA to retrieve user FN profiles from any property on the internet.

There are numerous, prominent websites—eBay, amazon, yelp—that track users in various ways. eBay includes buyer and seller rankings, Amazon and iTunes include product reviews, Yelp and Angie's List include service reviews. To the reader, these reviewers are strangers, with no relationship to the reader. We call this the Stranger Syndrome. All forums suffer from the same issue. Fundamentally, the reader must spend considerable time learning about each reviewer or trust the wisdom of the crowd mechanisms (ranking of individuals by the users of the site).

The FN solution addresses the stranger syndrome at any website by retrieving the stranger's FN profile, in its entirety or a specific to the website focus. The mechanism used depends on the level of FN integration of the website; a fully integrated website can access specific FN services appropriate to the website, while a non-partner site will retrieve information based on tags, URLs or with user input to retrieve required information from the FN.

Product, Services and People are not Equal

Web3SA recognizes that the best sources of recommendations are those you trust; fortunately, they also care enough to respond to your requests for recommendations, and to proactively post their recommendations where their friends can find them.

The Web3SA reference network overlay is a social application. Will users create a network of references to service providers? Traversing the reference network overlay will benefit the user, who will in turn generate his own recommendation of the service provider.

Product references are straightforward; typically, there is little for a user to gain by recommending a poor product. She wouldn't do that to her friends. Product recommendations can often be bound to AN, cameras for photography FNs, clubs for a golf network, etc. Others are reference-able, but may not be bound to an FN, novels or music, for example.

Recommending service providers is more complex, especially if they are friends.

Services on the Internet—how to Choose a Knee Surgeon?

Reference for services, as opposed to products, on the internet is an untapped business opportunity. The FN will offer a SA written specifically to allow friends to share and solicit existing references to service providers: heart-surgeons, lawyers, contractors, baby-sitters, etc.

The existing sites all suffer from the stranger syndrome, and there is no analogue to linkedin's business network for the valuable references and relationships held by consumers of services. LinkedIn allows one to search thru the business relationships beyond the $1^{st}$ degree. This search allows one to get to a destination, with minimal support for the criteria necessary for an effective search, namely the proficiency of target and the affinity/trust of the recommender.

How does one find a good knee-surgeon? By leveraging the FN to find one ranked highly (proficiency) by those with the greatest (or perhaps least?) affinity to the seeker. When trying to find a target service, a seeker cares about proficiency and affinity, and access to the reviewer (his ranking and my affinity to him) and why he/she recommends this provider. The reviewer's affinity to the service provider also matters, as opposed to the seeker's affinity to the reviewer (does the reviewer care about the seeker getting the best provider or is the objective to help the service provider find one more client?)

Optimizations:

"Anti-Shilling" filter for reviewers with or without high affinity to service provider Normalization filter for reviewers The target need not necessarily be in a user's FN; the ability to traverse the FNs of those in the user's own FN is still more effective than a search outside the FN. The most proficient surgeon may not be in the user's FN, the user would traverse the FN to find the one with the highest proficiency. Proficiency here is the system ranking (wisdom of the crowds) of the surgeon.

Affinity, Proficiency and Reference

A user can prioritize (filtering and sorting) the product reviews based on his FN affinity with the reviewer, and the reviewer's perceived proficiency in the subject (both user and system-wide proficiency rankings).

Use Case Demonstrating Reference Propagation Across FNs

A real life example. I was invited to a party of my OneClickTennis friend who used Evite.com to get RSVPs for the event. The food at the event was provided by a catering company. A lot of guests liked the catering service and would now recommend it to others.

Now, suppose that OneClickTennis and Evite are both Web3SA partners, and I have an FN for each. On the Evite FN I see all my friends who also visited the party (and many of whom are NOT tennis players). If one of these friends added a review of the catering company and website and I endorse the same review, it gets propagated through my profile to my other friends on the one or both FN minifeeds, and remains permanently accessible.

Next time one of my FN friends looks for a caterer, they are going to see my endorsement, and the review of my non-tennis friend (he is a FoF for them).

Utility to the FN users, endorsement and business for a deserving vendor!

Proficiency

Proficiency is associated with FN, activities, services, etc. The system will rely on a manual ranking to conclude wisdom of the cloud proficiency ranking, Within a FN, the owner will also be rank each contact, and can utilize both owner and system proficiency rankings in SAs, searches, etc.

How does proficiency differ from reputation?

State of Social Networks and SG Trends, Limitations with Social Networks

Existing social networks are typically large and flat; insular, and everyone is one degree away from you—friends, colleagues, associates, and people are often invited to "connect with" strangers. The driver behind this seems to be that a large network is beneficial, indicative of popularity, influence, connectedness, etc. The value of a massive glut of first-degree connections is similar to the value of large volumes of information on the internet. Refined, high quality networks are hidden in the first-degree network and mining or utilizing them is inefficient. As with all things internet, the fad tends to overwhelm.

The challenge faced by all SNs currently is stratification of the $1^{st}$ degree network, but this conflicts with the DNA and business model of these SNs, which is to enroll as many eyeballs as possible. Paradoxically, one could argue that since everyone is always 6 degrees away, proximity in small networks is identical to large ones, but with fewer, more authentic interconnections.

Another frustration for users of SNs is ownership and interoperability of the distributed and fragmented social networks. The trend is for SNs to support interoperability and APIs, (FOAF, XFN, hCard, OpenIdentity), but ownership and identity remains fragmented across various sites. How does the consumer get control of his/her own social graph and identity, and manage this independently from vendor sites? Equally important is the ability to control and determine contextual privacy.

Another aspect to this is the lack of a common identity (identities) across the web, so that random encounters of users on the web point to the identity of the user. If the identity also included one's social graph, then the reader's relationship to the user would be contextual.
Social Network Portability and the Social Graph
  All current SNs are walled gardens; the SN is isolated to a particular service.
  Until recently, none of the existing SNs exposed or leveraged their SG beyond the service itself. The latest trends are to reverse this; there are open source developers proposing and implementing solutions to export and aggregate walled SNs into a user's SG. Our expectation is that by late 2008 there will be open source solutions that allow users to consolidate their SNs into portable, global SG. But then what?
Benefits to the Consumer
  Control one's own social graph
  Present the broad social graph and allow user to edit it into FNs. Primary benefit is refine/reduce information overload.
  Create meaningful FN
  Import, manage and export of data. Allows user to aggregate and then own their data. Integration of fragmented identity
  Contextual privacy
  User centric (web.3.0) net
  Shared or group identities, a couple sharing email?
Vendor/Websites Offers/Promotions
  Vendors/websites will offer incentives to members of activity specific FN. For example, a vendor may offer points/benefits to FN owners/members who enroll the FN in relevant sites. Sporting goods vendors to sports oriented FNs. [IP]
  Group buying power
  Web3SA revenue sharing with users, equity promotions
  SWOTs
  Benefits to Partners
  Instant SNs at the partner site
  Most ecommerce vendors, or click-and-mortars, have no access to SN or SA. The FN is potentially an exceptional marketing vehicle, one that can be used to for viral marketing, promotion, sales and analysis.
Access to the Entire Web3SA Community
  By creating FN and connecting to the Web3SA solution, partners get indirect access to a larger community. This indirect access is all thru FNs, so is a trusted conduit to FoFs.
FN is Beneficial to Customers
  Partners can market and capitalize on the creation of FNs as beneficial to their customers.
  The partner can deliver the FN to the customer gratis; no effort is required by the customer to create the FN. The FN can be used to website related activities, to promote merchandise, offer discounts, etc.
Viral Marketing
  The FN is a viral promotional and marketing tool for any website, since partners can leverage their content and users to create SNs and expose them to the entire Web3SA community.
Enrollment in Vendor Sites/Services
  Enrolling users into multi-vendor sites/FNs. Users may join multiple FNs, and enroll in multiple sites simply by joining a FN. When users invite friends to join FNs, these friends may opt-in to enrolling in sites that service the FN.
Market Research and Analytics
  The FN can be used to track user and product reviews, solicit customer input, etc.
SWOTs
  How do we get Partners to promote it to their Partners?
  Vendors resist sharing customers
  Want to own the FN. Perhaps they should.
  Want to control what users do on FN. This is important
  Social networks, including SN search
  Social applications—groupshare, entertainment
  Recommender systems
  Ranking systems
  Trust networks
  The following elements are unique:
  SAO to the internet, filter based on proficiency, affinity
    Overlay threat—new vendors, products, FN advertising
    Overlay based on content, not mouse. When landing on page
    Gui=icons of relevant items, icon to expand relevant items
  SAO methods/mechanism, either integrated or not
  FN overlay plus methods, eg search for FN user from amazon, plugin search for FN attributes of displayed content (dynamic, automated)
  My world network and methods to autogenrate and manually add relationships
  Reference Network Overlay
  Single invitation to a SN can automatically/optionally register/user user with provider and vendor sites.
  FN page ranking, specific to each user/FN, based on content and reviewer, proficiency affects,
  Affinity/orbits—gradation/refinement of relationship within $1^{st}$ degree FN, affinity of reviewer to user vs service provider. Method to rank and display SA attribute/service, by affinity, dynamic affinity to model real social relationships, method to modify affinity over time based on level of interaction (API, surveillance by user of friends), affinity changes over time, fed by partner website/lack of interaction reduces affinity/user can control this by marking a friend at a certain affinity/, filter enemies/idiots
  Method of creating SN by crawling websites with non-SN data (also SN sites) to deduce social connection, SG semantic indexing
  FN proficiency methods for service providers (wisdom of crowd, user specific) to construct aRN with RNO
  Ability to create non-FN (asymmetric) for any SA (feeds, and FN-API). Only monitor registered users who have profiles where they agree to share info
  Gui
  RT feeds to/from vendors when users are shopping; competitive offers when browsing for products. Sale bar from different vendors for each product.
  Group buying on or off RT feeds.
Use Cases—OneClickTennis
  OneClickTennis.com is a tennis player matchmaking tool. It matches up tennis players by skill level, schedule/time availability, geographical location, etc. For each member tennis player it provides:
  A calendar tool for tennis match scheduling
  A "last minute pickup" auction of available tennis players
  A match result and opponent feedback form
  Tracking of one's standings/rankings in multiple tennis ladders, tournaments and other events/venues/playlists.
  History of matches, graphing of player's performance levels over time.
  In the background, there is a statistical inference engine at work that calculates everyone's dynamic rating (skill level) and creates matches between closely-ranked opponents, thus ensuring that each match will be interesting for both players.
  The website also features:
    personal & group coaching sessions league play (coming soon)
doubles mixer events
local tournaments and cross-area championships As an admin of OneClickTennis.com, I become an architect of the default FN for each of my site's members. Once I'm done, each user will do his/her own fine-tuning. There is a wealth of relationship/friendship information I could deduce from my database. I can enroll my website into the FN server by using the following approaches and considerations:

a. When two (or four) players play a tennis match, they become acquaintances and form a connection in the FN graph. All such connections are of type "OneClickTennis" (with possible sub-types based on activities within my website).
b. People who have played w/each other more often are likely to be closer friends: thus, the number of matches played together can serve as an Orbit rank.
c. Being a partner (playing on the same side of net) in a doubles game is a more "friendly" experience than playing as opponents. Thus, two partners who have played N matches together are closer to each other than two opponents.
d. Being on a league team (e.g. representing your tennis club, city, university) creates strong ties to other team members that often go beyond tennis. Thus, members of the same league team will get an extra Orbital proximity rank.
e. OneClickTennis uses statistical modeling to calculate the level of tennis skill of each player. This value can be used as an indicator of Proficiency.
f. It should be noted that the main idea of Proficiency Rank is for one friend to indicate how much he/she respects the opinion of another friend about X. Just because someone is a better player or have played a lot more matches doesn't necessarily make one a good source of advice about tennis. However, the reverse is typically true. So, the approach in (d) and (e) is by no means perfect, but . . . . As an admin, all I can do is provide this Proficiency Rank as a "conversation starter" to get my users to start thinking and re-ranking manually those people whom they really trust and take advice from.
g. Another value that can be used for Proficiency is the total number of matches played and the total length of membership.
h. OneClickTennis is a tool for organizing various tennis-related activities: coaching clinics, mini-tournaments, doubles-mixers. The information about each member's activities can be used to form activity-related sub-graphs (each members sees them as small subnets within his/her overall FN) within the "OneClickTennis" main activity. For example, I'd like to create a subnet for each league team.

I use the FN API (it is a synchronous SOAP/XML/HTTP API):

i. Fn=createNetwork(networkName)—add OneClickTennis-specific connector type
j. Activity=Fn.createActivity(activityName, description)—add description of a sub-FN (e.g. the name of each league team or university/college/high-school team, or the name of a tennis ladder)
k. Activity.addFriend(anotherFriend, orbitRadius)—I will call this for each tennis match, since each match creates at least a basic connection between two people. The number of matches played is used to calculate the orbitRadius (i.e. the affinity between friends).
l. Activity.setProficiency(friend, beholderFriend, proficiencyRank)—sets the proficiency rank of friend—as perceived by the beholderFriend. (in particular, this is what I expect the end-users to correct and fine tune later). In OneClickTennis, I have this info from 3 values—so I may need to come up with a formula how best to merge these 3 values into 1, the proficiencyRank. The 3 values are: membership length, total # of matches played, and the statistical skill rating.

After I import the initial data from my website into the FN server, I also program these simple calls into my website code, so that it sends updates and new data on the fly.

I log in into the Admin pages of the FN server to see the resulting social graph that was created this way from the flat user database at my website OneClickTennis.com.

Figure 11:
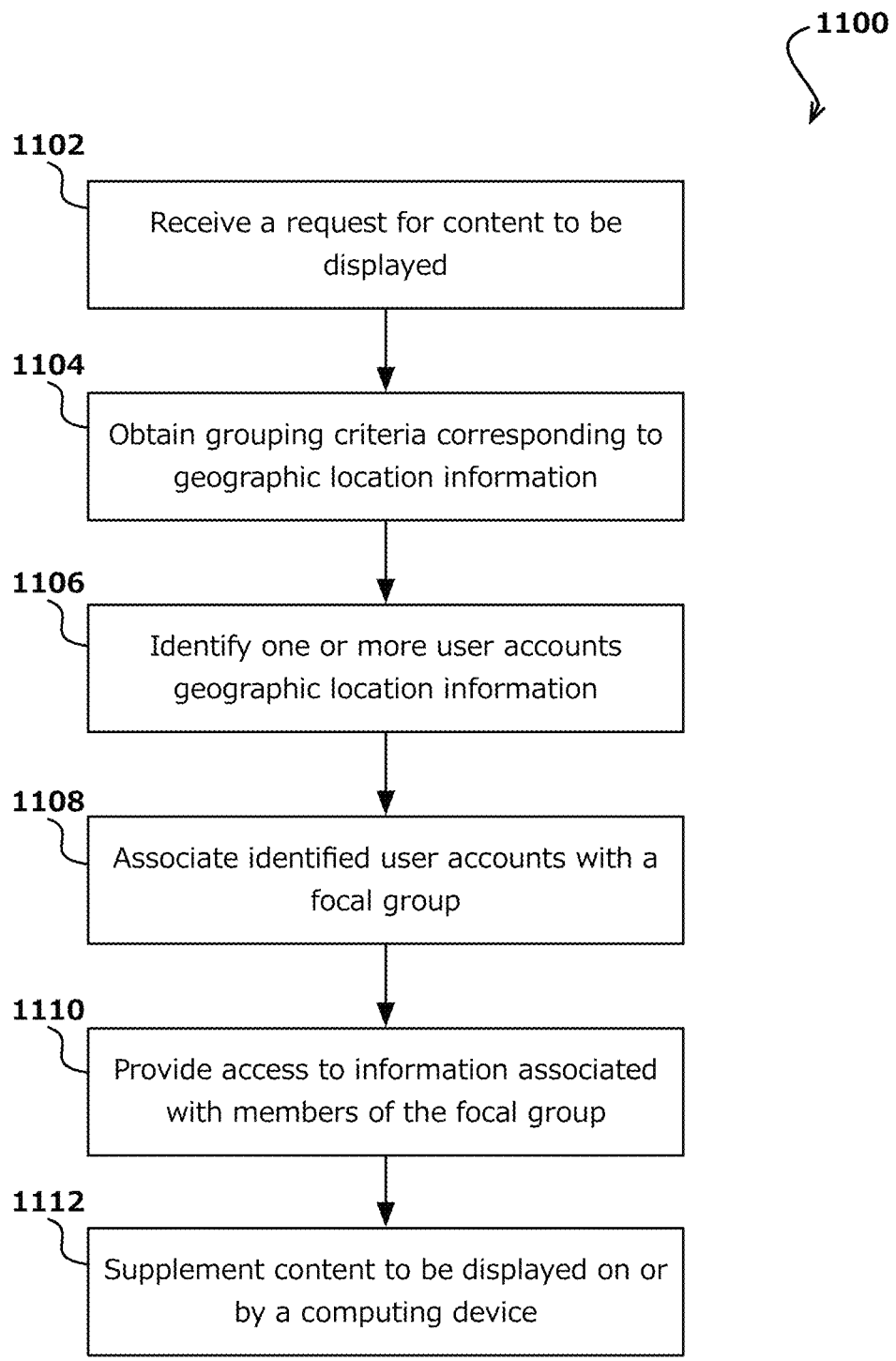
FIG. 11 illustrates an example process for determining relevant content based on grouping criteria for a geographic location in accordance with various embodiments.

FIG. 11 illustrates an example process 1100 for determining relevant content in accordance with various embodiments. It should be understood that, for any process discussed herein, there can be additional, fewer, or alternative steps performed in similar or alternative orders, or in parallel, within the scope of the various embodiments unless otherwise stated. In this example, a request is received 1102 for content to be displayed on (or otherwise presented via) a computing device, in this case for a particular user of the computing device. The user can be associated with a user account and the user account can be associated with a portable aggregated social graph, which includes a plurality of user accounts organized into one or more focal groups based at least in part on grouping criteria. In this example, the request can be associated with grouping criteria which can include at least location information such as a desired geographical location, an actual geographic location, and the like. As will be described herein, grouping criteria can include time information as well as additional information (e.g., interests, education, school, etc.) operable to group users into groups. In accordance with various embodiments, a focal group can include at least one user account. For example, a focal group can include a user account corresponding to friends, family members, people with common interests, corporate entities, etc. Individual user accounts can correspond to an entity such as a person, a company, etc. In various embodiments, the user account is associated with user. For example, through common interests, requests to connect, family, school, etc.

In order to provide relevant information from focal group members associated with a focal group, grouping criteria corresponding to geographic location information associated with the user, or a user account, and/or device associated with the user can be obtained 1104. For example, in accordance with various embodiments, when an appropriate application is active, geographic location information associated with the user's computing device can be determined. The geographic location information can be used to determine a geographic location. The location information can include a current geographic location of the user, or of a device associated with the user, a geographic location of interest to the user such as a desired geographic location or anticipated geographic location, a combination of a current geographic location and one or more desired geographic locations, etc. Example geographic locations include geographic areas or geographic regions such San Francisco, Calif.; a city, a neighborhood, a state, a park, a restaurant, a coffee house, etc. The geographic location, area, or region can be associated with an address or GPS coordinates, a zip code, and the like. In various embodiments, the size of the geographic location is not limited by size, and can include geographic areas or regions of various sizes. The geographic location can be adjusted as needed or otherwise desired by the user.

Once the geographic location is determined, one or more user accounts can be identified 1106 based on the geographic location information associated with the geographic location to determine a focal group that includes at least one member. The focal group can, in different embodiments, include some or all of the user accounts associated with the portable aggregated social graph. For example, information provided from user accounts that relate to the geographic location or grouped around a topic of discussion associated with the geographic location can be identified. In an example, this can include a user account publishing a review of a restaurant, a coffee house, a landmark, an event, or other such area, event, and/or object of interest in the geographical location. In this way, the location information can be used to select or otherwise filter user accounts based on information provided by the user accounts that is associated with the geographic location to determine a focal group of members that have at least some experience with the location.

The identified user accounts can be associated 1108 with (i.e., focal group members) a focal group for the location and interactions of the focal group members in this location can provide members of the focal group with information having relevance to the geographic location and thus the focal group of the geographic location. Access is provided 1110 to information associated with members of the focal group based at least in part on a relevance score associated with individual members of the focal group. This can include, for example, providing information from members associated with a highest score although in various other embodiments information can be provided in accordance with other approaches. Thereafter, the information can be used to supplement 1112 content to be displayed on or by a computing device. For example, the information can be used to add, filter, emphasize, etc. content displayed on a computing device.

In an example use case, a focal group of a geographic location includes a restaurant row of a city's downtown, with the focal group members sharing reviews and ratings of a local restaurant on the restaurant row. A user of a web browsing supplement can obtain information of focal group members for this geographic location where the restaurant is located, ranked by a level of importance. Thereafter, at least a portion of the information can be used to supplement content presented on a computing device. As described, this can include in some embodiments, based on the content displayed on, or otherwise associated with an interface being viewed by the user, utilizing an overlay or other display element to provide or adjust content displayed based at least in part on the information. For example, the information on the interface can be supplemented by providing additional information (focal group information) that is related to the information being presented. Additional information can include, for example, past experiences of one or more of the focal group members, and/or recommendations by the one or more focal group members based on the past experiences. In another example and as described herein, the information presented on the overlay can be filtered based on the information of the focal group.

Figure 12:
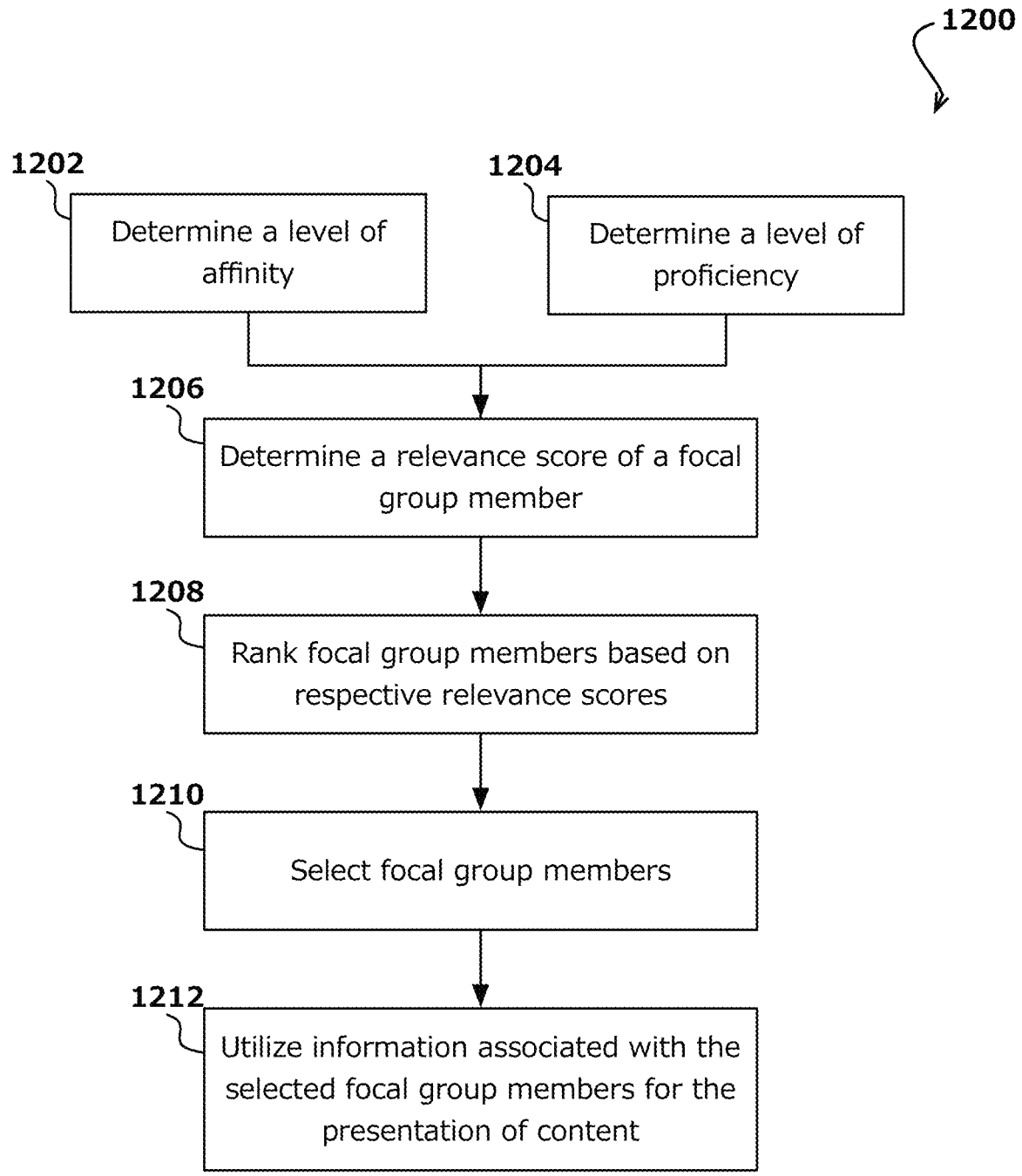
FIG. 12 illustrates an example process for determining relevance scores that can be utilized in accordance with various embodiments.

As described, access is provided to information associated with members of the focal group based at least in part on a relevance score associated with individual members of the focal group. FIG. 12 illustrates an example process 1200 for determining relevance scores in accordance with various embodiments. In this example, in order to determine relevance scores, and thus, what information to use to supplement a presentation of content, and the order and/or arrangement in which to display the information with the content, a number of pieces of information is determined or obtained. It should be noted that while the information is shown in the figure to be done sequentially for purposes of explanation, it should be understood that in many cases at least some of these steps will be done concurrently or in different orders as mentioned above. It should be further noted that in various embodiments, information associated with a focal group member can obtain a relevance score in addition to, or instead of, the corresponding focal group member, and the relevance score associated with the information can be used in accordance with embodiments described herein. For example, the score can be used to identify information to supplement content displayed on or by a computing device.

In this example, a relevance score can be determined based at least in part on a perceived level of importance of members of a focal group. In an embodiment, to determine a level of importance, a level of affinity between the user and the members of the focal group is determined 1202, as well as a level of proficiency or expertise of individual focal group members is determined 1204. The level of affinity and the level of proficiency can be specific to a focal group member, for example, and can be based upon specific member data.

In an embodiment, the level of affinity can be determined, in part, by a member's proximity to the geographical location of the focal group or of the user. Accordingly, in this example, location information for a user and location information for focal group members can be obtained. The location information can be analyzed to determine one or more distance metrics between the user, focal group members, and a geographical location. In the situation where the distance between the member and the geographical location or user is small, or below a determined threshold, and/or within one or more determined thresholds, the affinity of the member can be weighted higher as there is a higher likelihood of the focal group member's information being important and relevant to the user.

The level of expertise or proficiency can be determined, based at least in part, on a member's number of visits to a the geographical location, a member's association with the geographical location, a member's expertise, etc. In an example of a local restaurant, the level of expertise and/or the level of proficiency of a focal group member may be due to a high number of visits by the focal group member to the restaurant, or because the focal group member is in a professional in the food industry.

It should be understood that in light of the present disclosure, however, that other factors can be used in determining a relevance score, and factors such as a respective member rank of the individual focal group members on a particular topic, and/or a respective level of performance of past information provided by individual focal group members, as well, among other such options.

In various embodiments, the level of affinity and the level of proficiency can be numerical scores or other such values. An example algorithm, such as a ranking algorithm or relevance profile, can be used to determine 1206 a relevance score of a focal group member based on a score of the level of affinity and a score for the level of proficiency. The level of affinity and the level of proficiency can be weighted in some embodiments and the weights for these scores can be tunable. For example, the weights can automatically be updated and/or manually updated.

Once the relevance scores are determined for individual members of a focal group in this example, the individual members can be ranked 1208, ordered, or otherwise selected based on relevance. At least a portion of the members, such as highest ranked members, can then be selected 1210 based on relevance scores to have information associated with those members used in the presentation (e.g., display, play, or projection) of content to a user of a computing device, and can thereafter be utilized 1212 for the presentation of the content based on rank.

Figure 13:
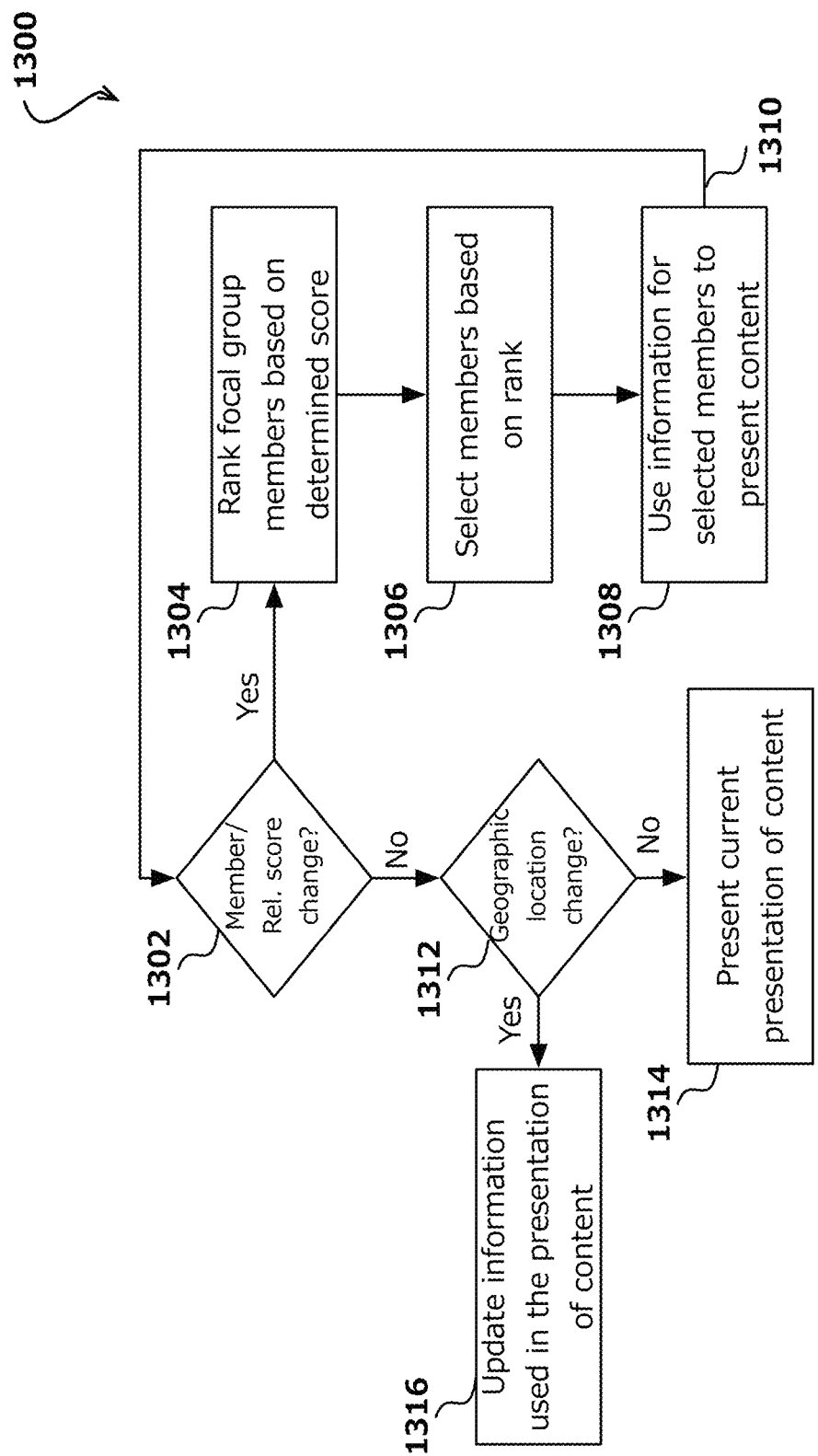
FIG. 13 illustrates an example process for updating content in accordance with various embodiments.

FIG. 13 illustrates an example process 1300 for updating content in accordance with various embodiments. As described, the affinity and/or proficiency between the user and each focal group member can influence the ranking assigned to each focal group member and can adaptively vary over time based on actions of each member, or the user.

For example, a determination 1302 can be made whether there is a change to members in the focal group. This can include in some embodiments the addition or removal of members to a geographic location. In another example, this can include a threshold change to one or more or a group of relevance scores. The threshold in some embodiments can include one or more relevance thresholds which can correspond to a threshold amount of change for a relevance score for an individual member, an average amount of change for a combination of relevance scores for a group of members, among other such combinations. In the situation where there is a change to members in the focal group and/or the change in relevance score(s) satisfy at least one relevance score threshold, the relevance scores can be ranked and the members of the focal group can be ranked 1304 or ordered based on determined relevance scores. Thereafter, at least a portion of the members can then be selected 1306 to have information associated with those members used in the presentation (e.g., display, play, or projection) of content to a user of a computing device, and can thereafter be utilized 1308 for the presentation of the content based on relevance. The process can then determine 1310 whether there is a change to the members in the focal group.

In the situation where there is no change to the members in the focal group, a determination 1312 can be made whether there is a change to the geographic location. In the situation where there is no change to the geographic location, or the change does not satisfy a change threshold (e.g., a minimum amount of change in distance), the current presentation of content can continue to be presented 1314. In the situation where the change satisfies the threshold, e.g., a geographic change threshold, then the information used for presenting content can be updated 1314 and used in the presentation and/or modification of content in accordance with various embodiments described herein. For example, when the computing device determines a change of the geographic location of the user, a browsing supplement or other such component can adaptively update the information of the focal group of the geographic location, communicate the update to a focal group server, and cause updated relevant information associated with the members of the focal group to be used for the display of content. In an example use case, as a user walks along a restaurant row, and the geographic location of the user changes, a browsing supplement can overlay the currently browsed information with information of the focal group, which is updated based on the change in the user's geographic location.

In accordance with various embodiments, the geographic location can be adjusted as needed or otherwise desired by the user. For example, in at least some embodiments, the user is able to specify a coordinate, address, or other such location associated with a geographic location. In some embodiments, for each location, the user can specify at least one distance or other range-determining metric. For example, the user can specify a radius, for example R, indicating a distance from that location where the user would like members of the focal group to be selected from. It should be understood that while a radius is used in the above example, other approaches to defining regions can be used as well within the scope of the various embodiments. For example, a user might define a city, region, or other such area as an area of interest. Similarly, the user might use rectangular or other shapes to define various regions. In at least some embodiments, a user can specify multiple locations that each might have different associated focal groups.

In at least some embodiments, the location of the user can be determined through the location of an electronic device associated with the user. For example, the user might have a smart phone or tablet computer which the user typically carries with him or her at most times. The device might have a global positioning system (GPS) or cellular triangulation mechanism, for example, that enables the location of the device to be determined. It should be noted, however, that there is no requirement for the computing device to provide any dynamic geographic location information. For example, a user may choose a location different than a current location can access in accordance with embodiments described herein information of a focal group of a desired geographic location. In an example use case, a user is planning a vacation and has chosen a general destination area, for example, Bora Bora. A browsing overlay can provide the user with ranked relevant information of members (at least one) of a focal group for the given geographic location, Bora Bora. Similarly to the user, the focal group member(s) contributing the ranked information may or may not have had a geolocation-enabled computing device, but have communicated respective geographic locations in other ways, which can make their information relevant to the user. Thus, neither the user nor the focal group member are required to have a geolocation-enabled computing device for this embodiment to be possible.

Figure 14:
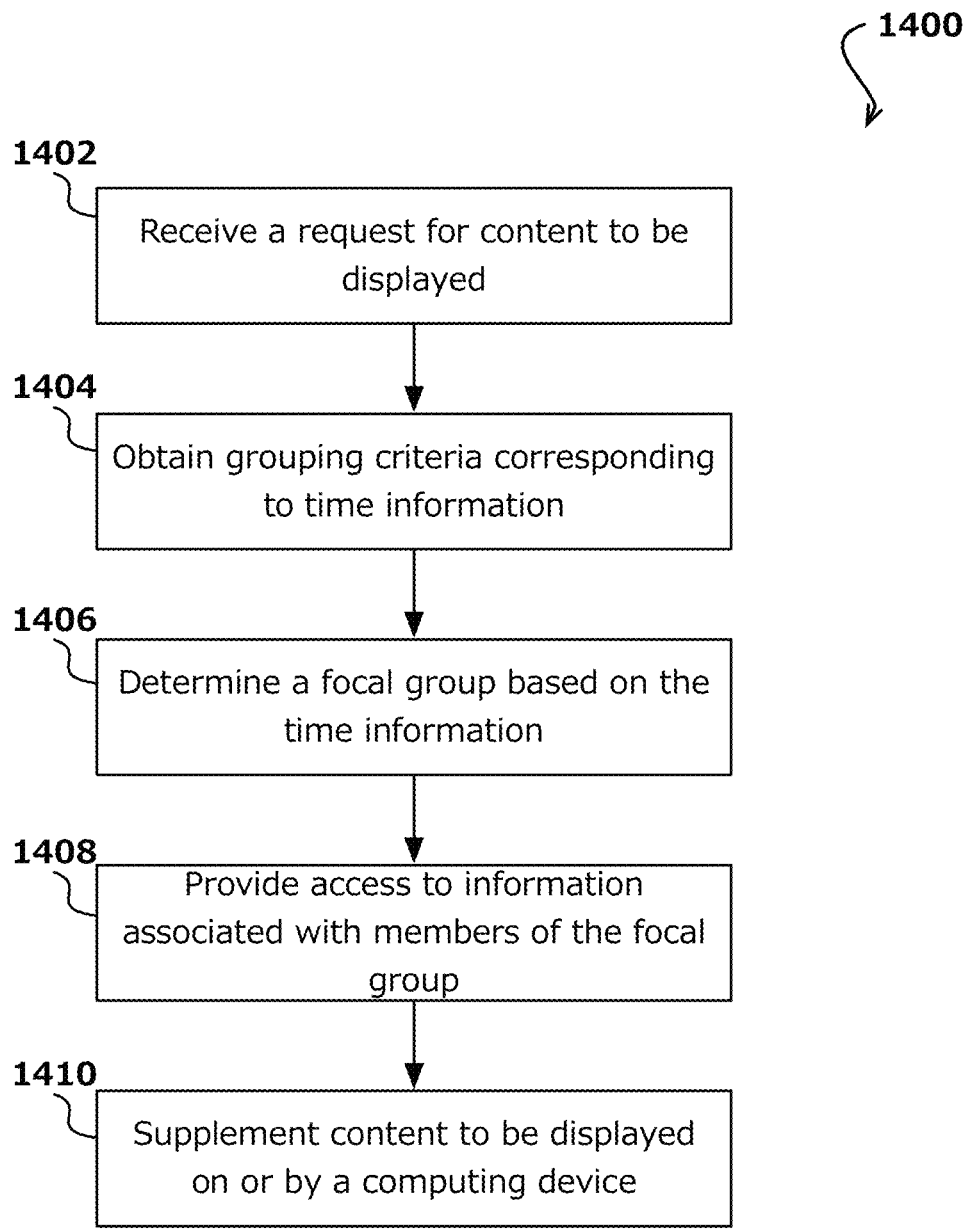
FIG. 14 illustrates an example process for determining relevant content based on grouping criteria for a time event in accordance with various embodiments.

FIG. 14 illustrates an example process 1400 for determining relevant content in accordance with various embodiments. As with the previously discussed process, a request is received 1402 for content to be displayed on (or otherwise presented via) a computing device, in this case for a particular user of the computing device. The request can include grouping criteria associated with time information such as past time information or current time information, and the time information can be associated with at least one time event. A time event can be an event occurring during a particular period of time. Examples of time events can include, for example, a sporting event such as Olympic Games or a tennis Grand Slam, a cosmic or weather event such as a meteorite fall or a snow storm, an ongoing event such as the Global Warming, and the like.

The user can be associated with a user account and the user account can be associated with a portable aggregated social graph, which includes a plurality of user accounts organized into one or more focal groups based at least in part on grouping criteria. In response to the request, the time information can be obtained 1404 and a focal group can be determined 1406 based on the time information, where the focal group can, in different embodiments, include some or all of the user accounts associated with the portable aggregated social graph. For example, the focal group can include members who are associated through one or more time events, with the focal group members having experienced or are currently experiencing (or living through or witnessing) the event(s), or having relevant information of the event(s). Access is provided 1408 to information associated with members of the focal group based at least in part on a relevance score associated with individual members of the focal group. This can include, for example, providing information from members associated with a highest score, although in various other embodiments, information can be provided in accordance with other approaches. Thereafter, the information can be used to supplement 1410 content to be displayed on or by a computing device. For example, the information can be used to add, filter, emphasize, etc. content displayed on a computing device.

As described, a relevance score can be determined based on a perceived level of importance of members of a focal group, where the perceived level of importance is based on a level of affinity between the user and the members of the focal group and a level of proficiency or expertise of individual focal group members. In this example, the affinity of focal group members and their level of proficiency may be measured by the degree of having and providing to the focal group relevant information of an event, and having more interest in acquiring further such information. Providing relevant information can include publishing information (e.g., text, images, video, etc.) associated with an event. Interest in an event can be shown by following interest groups, people, etc. associated with an event, publishing information about the event, etc. In accordance with various embodiments, the time event of the focal group may be a past, future, or present event.

Figure 15:
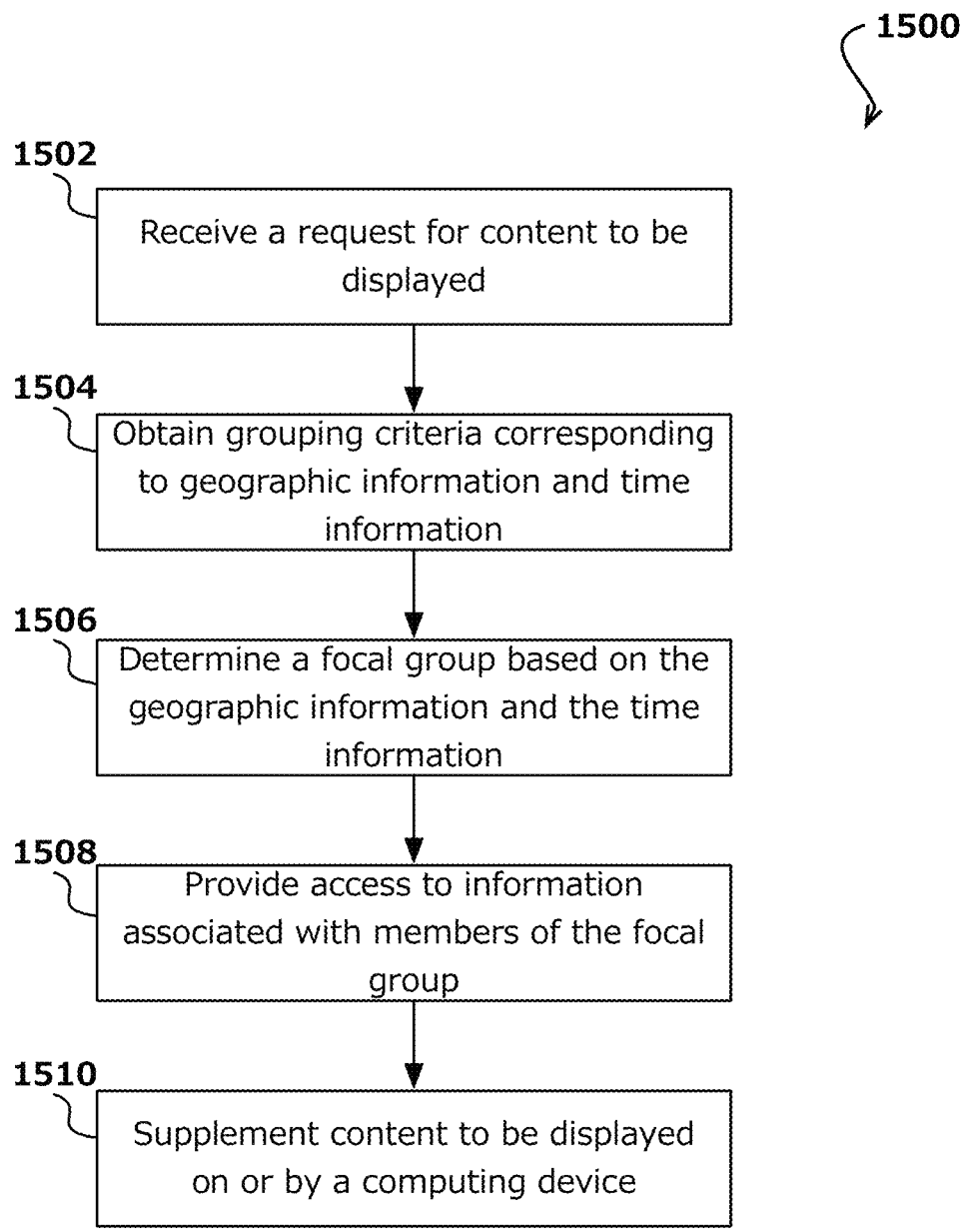
FIG. 15 illustrates an example process for determining relevant content based on grouping criteria in accordance with various embodiments.

FIG. 15 illustrates an example process 1500 for determining relevant content based on grouping criteria in accordance with various embodiments. In this example, a request is received 1502 for content to be displayed on (or otherwise presented via) a computing device, in this case for a particular user of the computing device. The request can include grouping criteria, such as location information and, time information, or other such information. As described, the user can be associated with a user account and the user account can be associated with a portable aggregated social graph, which includes a plurality of user accounts organized into one or more focal groups based at least in part on the grouping criteria.

In response to the request, the geographic location information and the time information can be obtained 1504, and a focal group can be determined 1506, where the focal group can, in different embodiments, include some or all of the user accounts associated with the portable aggregated social graph. For example, the focal group can include members who are associated with a geographic location and one or more time events, with the focal group members having experienced or are currently experiencing (or living through or witnessing) the event(s), or having relevant information of the event(s) at or near the geographic location. Access is provided 1508 to information associated with members of the focal group based at least in part on a relevance score associated with individual members of the focal group. This can include, for example, providing information from members associated with a highest score, although in various other embodiments, information can be provided in accordance with other approaches. Thereafter, the information can be used to supplement 1510 content to be displayed on or by a computing device. For example, the information can be used to add, filter, emphasize, etc. content displayed on a computing device.

For example, a focal group may comprise a group of members restricted by having a time and a space association simultaneously, being, or having been previously, at the same time in the same geographic location, or having knowledge and relevant information of a particular geographic location at a particular time and providing that information to the focal group. In an example use case, a focal group can be for wedding planning, an event that is set to happen at a near-future time in a predefined location. Members of the focal group may be the guests invited to the wedding, with any of them at any time acting as a user performing web browsing with an overlay of the focal group-contributed ranked information relevant to both the wedding and the user's browsing.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs and in accordance with the teachings herein, or it may prove convenient to construct more specialized apparatus to perform one or more method steps. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein. Although specific embodiments of the embodiments have been described and illustrated, the invention is not to be limited to the specific forms or arrangements of parts so described and illustrated. The invention is limited only by the appended claims.

What is claimed:

1. A computer-implemented method, comprising:
   using at least one content analysis technique to recognize content presented on an interface of a computing device associated with a user account;
   accessing a portable aggregated social graph associated with the user account, the portable aggregated social graph including a plurality of user accounts associated with disparate social networks, the plurality of user accounts operable to be organized into one or more focal groups based at least in part on grouping criteria associated with individual user accounts and the content presented on the interface;
   obtaining grouping criteria information associated with the user account;
   determining a plurality of relevance scores for the plurality of user accounts based on the grouping criteria information associated with the user account and the grouping criteria associated with the plurality of user accounts;
   selecting at least one user account based on the plurality of relevance scores, the at least one user account associated with a focal group from the one or more focal groups;
providing access to information associated with the at least one user account; and
   using an overlay to modify a view of the content by supplementing the content based on at least a portion of the information associated with the at least one user account.

2. The computer-implemented method of claim 1, wherein the grouping criteria includes one of location information or time information.

3. The computer-implemented method of claim 2, wherein the location information includes one of a current location associated with a user of the user account or a location of interest selected by the user.

4. The computer-implemented method of claim 1, wherein recognizing the content presented on the interface further includes:
   using one of a semantic language technique or an image recognition technique to analyze the content displayed on the interface.

5. The computer-implemented method of claim 1, wherein the overlay is used to at least filter the content based at least in part on the information of the at least one user account, sort the content based at least in part on the information of the at least one user account, or emphasize the interface with an identifier, wherein the identifier is related to the information associated with the at least one user account.

6. The computer-implemented method of claim 1, further comprising:
   determining the plurality of relevance scores based at least in part on a perceived level of importance of the at least one user account.

7. The computer-implemented method of claim 6, wherein the perceived level of importance is based at least in part on a level of affinity between the user account and the at least one user account, a level of proficiency indicated by the at least one user account, or a level of expertise indicated by the at least one user account.

8. The computer-implemented method of claim 7, further comprising:
   adaptively updating the level of affinity between the user account and the at least one user account over time based at least in part on one of a proximity of a focal group member associated with the at least one user account to a geographical location of focal group members associated with the focal group, or the proximity of the focal group member associated with the at least one user account to a geographical location of a user associated with the user account; and
   adaptively updating information associated with the focal group.

9. The computer-implemented method of claim 1, wherein the grouping criteria includes location information, the computer-implemented method further including:
   determining a change in the location information; and
   determining whether to adjust user accounts of the one or more focal groups based at least in part on the change in the location information.

10. The computer-implemented method of claim 9, further comprising:
    determining the change satisfies a change threshold;
    adjusting user accounts of the one or more focal groups; and
    adaptively updating information associated with the focal group.

11. A computing system, comprising:
    a computing device processor; and
    a memory device including instructions that, when executed by the computing device processor, enables the computing system to:
    use at least one content analysis technique to recognize content presented on an interface of a computing device associated with a user account;
    access a portable aggregated social graph associated with the user account, the portable aggregated social graph including a plurality of user accounts associated with disparate social networks, the plurality of user accounts operable to be organized into one or more focal groups based at least in part on grouping criteria associated with individual user accounts and the content presented on the interface;
    obtain grouping criteria information associated with the user account;

determine a plurality of relevance scores for the plurality of user accounts based on the grouping criteria information associated with the user account and the grouping criteria associated with the plurality of user accounts;

select at least one user account based on the plurality of relevance scores, the at least one user account associated with a focal group from the one or more focal groups;

provide access to information associated with the at least one user account; and use an overlay to modify a view of the content by supplementing the content based on at least a portion of the information associated with the at least one user account.

12. The computing system of claim 11, wherein the grouping criteria includes one of location information or time information.

13. The computing system of claim 12, wherein the time information includes one of past time information or current time information.

14. The computing system of claim 11, wherein the instructions, when executed by the computing device processor, further enables the computing system to:

determining the plurality of relevance scores based at least in part on a perceived level of importance of the at least one user account, wherein the perceived level of importance is based at least in part on a level of affinity between the user account and the at least one user account, or a level of proficiency indicated by the at least one user account.

15. The computing system of claim 14, wherein the instructions, when executed by the computing device processor, further enables the computing system to:

update the level of affinity between the user account and the at least one user account based at least in part on one of a degree of the at least one user account obtaining relevant information for an event included in time information, or a level of interest indicated by the at least one user account for the event; and update information associated with the focal group.

16. The computing system of claim 11, wherein the grouping criteria includes time information, and wherein the instructions, when executed by the computing device processor, further enables the computing system to:

obtain event information during a period of time referenced by the time information; and update the information associated with the focal group.

17. A non-transitory computer readable storage medium storing instructions that, when executed by at least one processor of a computing system, causes the computing system to:

use at least one content analysis technique to recognize content presented on an interface of a computing device associated with a user account;

access a portable aggregated social graph associated with the user account, the portable aggregated social graph including a plurality of user accounts associated with disparate social networks, the plurality of user accounts operable to be organized into one or more focal groups based at least in part on grouping criteria associated with individual user accounts and the content presented on the interface;

obtain grouping criteria information associated with the user account;

determine a plurality of relevance scores for the plurality of user accounts based on the grouping criteria information associated with the user account and the grouping criteria associated with the plurality of user accounts;

select a subset of user accounts based on the plurality of relevance scores satisfying a threshold, individual accounts associated with account information;

rank the account information for the subset of user accounts based at least in part on respective relevance scores; and use an overlay to modify a view of the content by supplementing the content displayed on the interface of the computing device with at least a portion of the account information based at least in part on the respective relevance scores of individual user accounts of the plurality of user accounts.

18. The non-transitory computer readable storage medium of claim 17, wherein the grouping criteria includes one of location information or time information, and wherein the instructions, when executed by the at least one processor to determine the plurality of user accounts, further enables the computing system to:

identify a first set of user accounts associated with the user account from the plurality of user accounts; and identify a second set of user accounts from the first set of user accounts based at least in part on the location information and the time information.

19. The non-transitory computer readable storage medium of claim 17, wherein the instructions, when executed by the at least one processor, further enables the computing system to:

determine the plurality of relevance scores based at least in part on a perceived level of importance of individual user accounts of the plurality of user accounts.

20. The non-transitory computer readable storage medium of claim 19, wherein the perceived level of importance is based at least in part on a level of affinity between a user of the user account and the plurality of user accounts, a level of proficiency of individual user accounts, a respective level of expertise of the individual user accounts, a respective member rank of the individual user accounts on a topic associated with the content, or a respective level of performance of past information provided by the individual user accounts.

* * * * *